United States Patent
Momosaki

(10) Patent No.: US 8,666,223 B2
(45) Date of Patent: Mar. 4, 2014

(54) ELECTRONIC APPARATUS AND IMAGE DATA MANAGEMENT METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 584 days.

(21) Appl. No.: 12/538,633

(22) Filed: Aug. 10, 2009

(65) Prior Publication Data

US 2010/0074590 A1    Mar. 25, 2010

(30) Foreign Application Priority Data

Sep. 25, 2008 (JP) .................................. 2008-246449

(51) Int. Cl.
*H04N 9/80* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 3/00* (2006.01)

(52) U.S. Cl.
USPC ........... 386/239; 386/248; 715/255; 715/716; 715/723

(58) Field of Classification Search
USPC .......... 386/278–290, 239–262; 715/255, 700, 715/716–726
See application file for complete search history.

(56) References Cited

U.S. PATENT DOCUMENTS

| 6,983,420 | B1 |   | 1/2006  | Itou et al. |
|---|---|---|---|---|
| 2002/0012523 | A1 | * | 1/2002 | Nakatani ........................ 386/52 |
| 2002/0034373 | A1 |   | 3/2002 | Morita et al. |
| 2002/0138838 | A1 | * | 9/2002 | Peters et al. .................... 725/58 |
| 2002/0178450 | A1 |   | 11/2002 | Morita et al. |

(Continued)

FOREIGN PATENT DOCUMENTS

| JP | 11-146325 A | 5/1999 |
|---|---|---|
| JP | 2000-312310 A | 11/2000 |

(Continued)

OTHER PUBLICATIONS

Explanation of Non-English Language References.

(Continued)

*Primary Examiner* — Hung Dang
(74) *Attorney, Agent, or Firm* — Knobbe, Martens, Olson & Bear LLP

(57) ABSTRACT

According to one embodiment, an electronic apparatus includes a storage device, a first display process module, and a second display process module. The storage device is configured to store a plurality of moving picture data, and still images which are composed of a plurality of still images extracted from the moving picture data with respect to each of the moving picture data. The first display process module is configured to display a list of the plurality of moving picture data. The second display process module is configured to display, in a case where to-be-deleted moving picture data is selected by a user from the list of the moving picture data, a deletion confirmation screen on which still images corresponding to the to-be-deleted moving picture data are arranged and which prompts the user to confirm whether or not to delete the to-be-deleted moving picture data.

7 Claims, 16 Drawing Sheets

(56) References Cited

U.S. PATENT DOCUMENTS

| | | | |
|---|---|---|---|
| 2005/0132420 A1* | 6/2005 | Howard et al. | 725/135 |
| 2006/0115236 A1 | 6/2006 | Miyazaki | |
| 2006/0248560 A1 | 11/2006 | Wada et al. | |
| 2007/0106675 A1* | 5/2007 | Watanabe et al. | 707/10 |
| 2008/0022230 A1 | 1/2008 | Ogawa et al. | |
| 2008/0031595 A1* | 2/2008 | Cho | 386/108 |
| 2008/0131073 A1 | 6/2008 | Ogawa et al. | |
| 2008/0144890 A1* | 6/2008 | Ogawa | 382/118 |
| 2009/0034806 A1 | 2/2009 | Hayase | |
| 2009/0190804 A1* | 7/2009 | Yokoi | 382/118 |

FOREIGN PATENT DOCUMENTS

| | | |
|---|---|---|
| JP | 2001-094865 A | 4/2001 |
| JP | 2001-167110 A | 6/2001 |
| JP | 2003-244652 A | 8/2003 |
| JP | 2004-304854 A | 10/2004 |
| JP | 2005-269563 A | 9/2005 |
| JP | 2006-157429 A | 6/2006 |
| JP | 2006-172116 A | 6/2006 |
| JP | 2006-309867 A | 11/2006 |
| JP | 2007-281680 A | 10/2007 |
| JP | 2007-331121 A | 12/2007 |
| JP | 2008-017041 A | 1/2008 |
| JP | 2008-017042 A | 1/2008 |
| JP | 2009-38680 A | 2/2009 |
| JP | 2009-141851 A | 6/2009 |

OTHER PUBLICATIONS

Notice of Reasons for Rejection mailed by Japan Patent Office on Oct. 27, 2009 in the corresponding Japanese application No. 2008-246449.

First Office Action issued by Japan Patent Office on Jul. 10, 2012 in the corresponding Japanese patent application No. 2011-059740.

Final Office Action issued by Japan Patent Office on Oct. 23, 2012 in the corresponding Japanese patent application No. 2011-059740.

\* cited by examiner

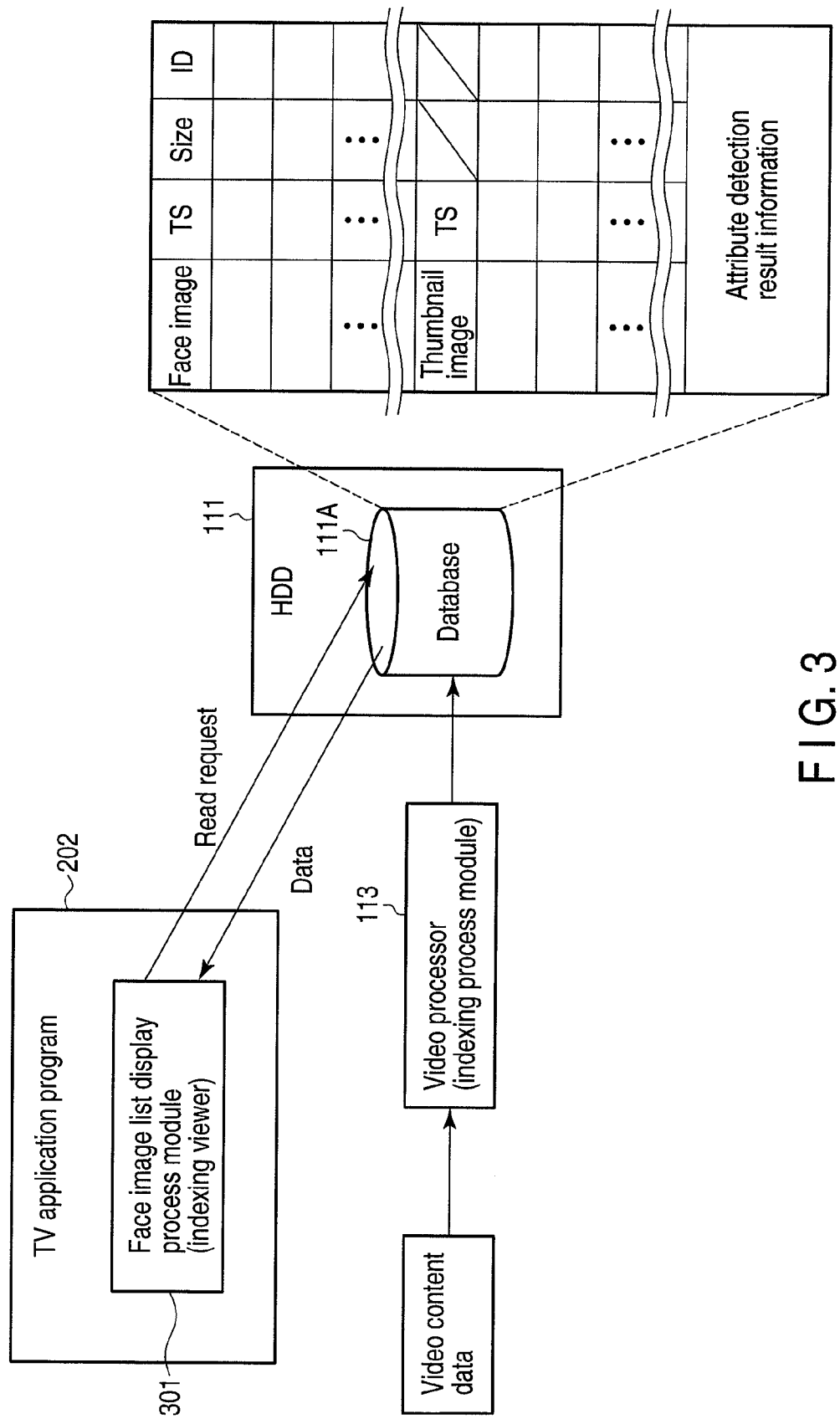
F I G. 3

Attribute detection result information

CM section table

| CM section 1 | Start time, end time |
|---|---|
| CM section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer / excitement level table

| Time | Cheer level | Excitement level |
|---|---|---|
| T1 | 10 | 5 |
| T2 | 20 | 5 |
| T3 | 10 | 6 |
| ⋮ | ⋮ | ⋮ |

F I G. 4

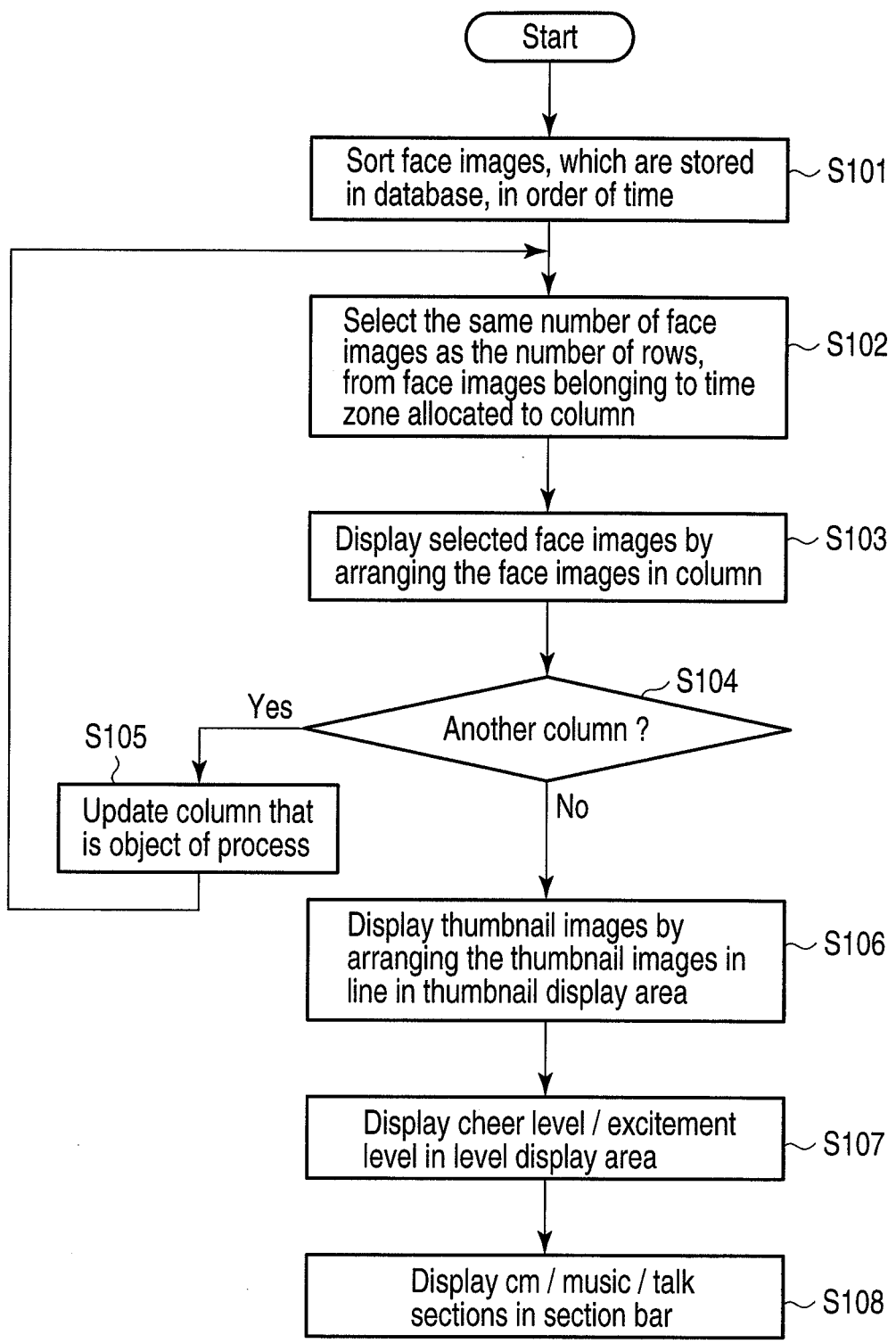
F I G. 14

ELECTRONIC APPARATUS AND IMAGE DATA MANAGEMENT METHOD

CROSS-REFERENCE TO RELATED APPLICATIONS

This application is based upon and claims the benefit of priority from Japanese Patent Application No. 2008-246449, filed Sep. 25, 2008, the entire contents of which are incorporated herein by reference.

BACKGROUND

1. Field

One embodiment of the invention relates to an electronic apparatus and an image display method, which support a user operation relating to deletion of moving picture data by using a still image which is extracted from the moving picture data.

2. Description of the Related Art

In general, an electronic apparatus, such as a video recorder or a personal computer, is capable of recording and playing back various video content data (moving picture data) such as TV broadcast program data. In this case, although tiles are added to the respective video content data stored in the electronic apparatus, it is difficult for a user to understand, from the title alone, what kind of content each video content data has. In order to understand the content of each video content data, it is thus necessary to play back the video content data. In the case of playing back video content data of a long total time, however, even if a quick forward function or the like is used, a great deal of time is needed.

Jpn. Pat. Appln. KOKAI Publication No. 2008-17041 discloses an information processing apparatus which displays face thumbnail images. This information processing apparatus has a function of displaying face thumbnail images corresponding to image content as an index for the user to select an entirety or a part of the image content.

Since there is a limit to the memory capacity of a storage device of the electronic apparatus, the user, in some cases, is required to perform an operation of deleting an unnecessary moving picture from moving pictures, such as program data, which are stored in the storage device.

In usual cases, when certain data is selected by the user as to-be-deleted data, a deletion confirmation screen is displayed for prompting the user to confirm whether the data may be deleted or not. This deletion confirmation screen, however, is an interface for simply re-asking the user if the data may actually be deleted, and the deletion confirmation screen displays only the "YES" button and "NO" button. Thus, the user is required to decide the deletion or non-deletion of the to-be-deleted data by his/her own judgment. However, there is a case in which the moving picture data, which is designated by the user as an object of deletion, includes a scene in which the user is interested. The user often forgets that such a scene is included in the moving picture data that is designated as an object of deletion.

It is necessary, therefore, to realize a novel function for supporting the user in deciding deletion or non-deletion of moving picture data.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram for describing a face image list display function of the electronic apparatus according to the embodiment;

FIG. 4 shows an example of section attribute information (attribute detection result information) which is used in the electronic apparatus according to the embodiment;

FIG. 14 is an exemplary flow chart illustrating an example of the procedure of a face image list display process which is executed by the electronic apparatus according to the embodiment;

DETAILED DESCRIPTION

Various embodiments according to the invention will be described hereinafter with reference to the accompanying drawings. In general, according to one embodiment of the invention, there is provided an electronic apparatus comprising: a storage device configured to store a plurality of moving picture data, and still images which are composed of a plurality of still images extracted from the moving picture data with respect to each of the moving picture data; a first display process module configured to display a list of the plurality of moving picture data; and a second display process module configured to display, in a case where to-be-deleted moving picture data is selected by a user from the list of the moving picture data, a deletion confirmation screen on which still images corresponding to the to-be-deleted moving picture data are arranged and which prompts the user to confirm whether or not to delete the to-be-deleted moving picture data.

Figure 1:
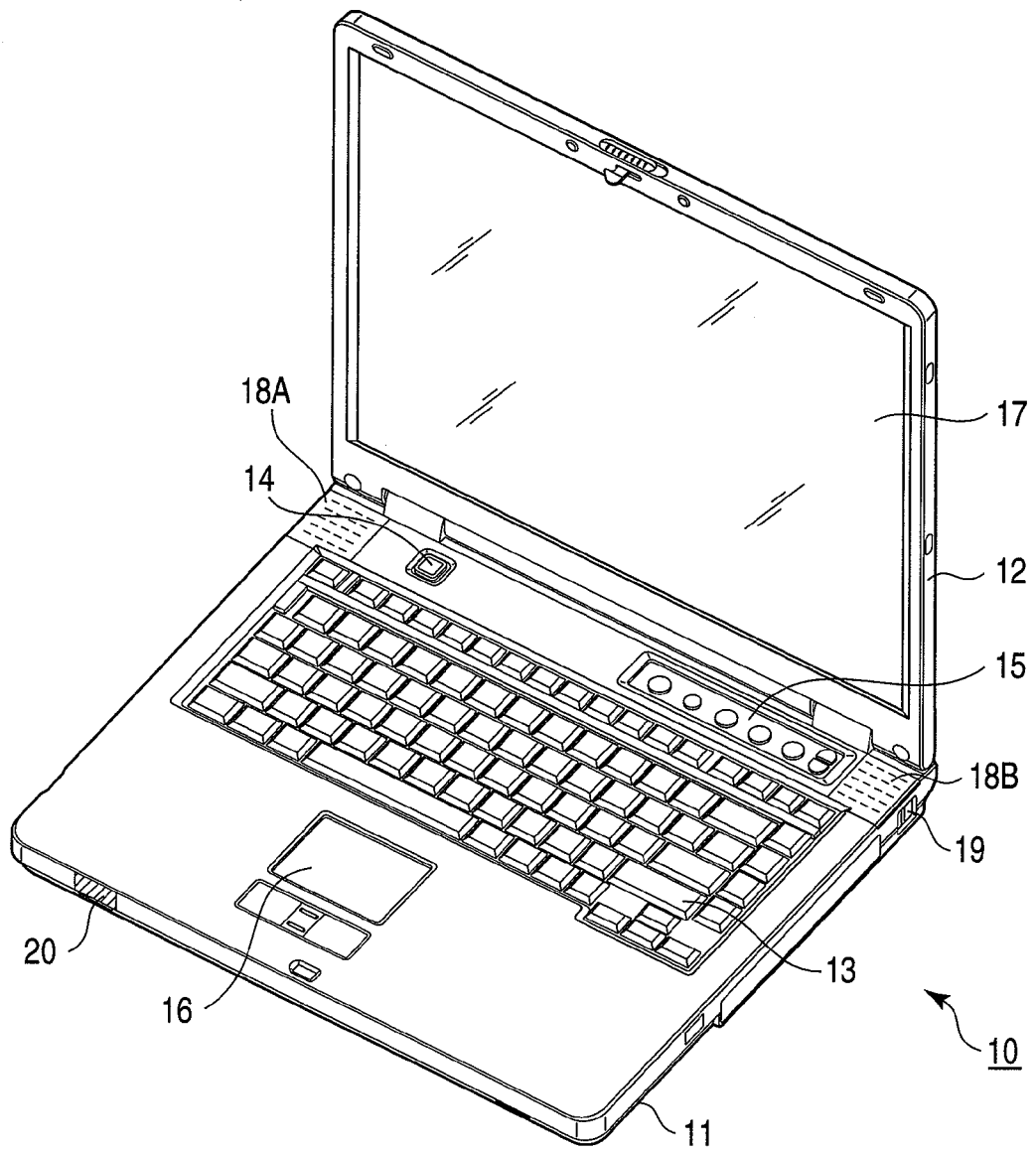
FIG. 1 is an exemplary perspective view showing an example of the external appearance of an electronic apparatus according to an embodiment of the invention.
Figure 2:
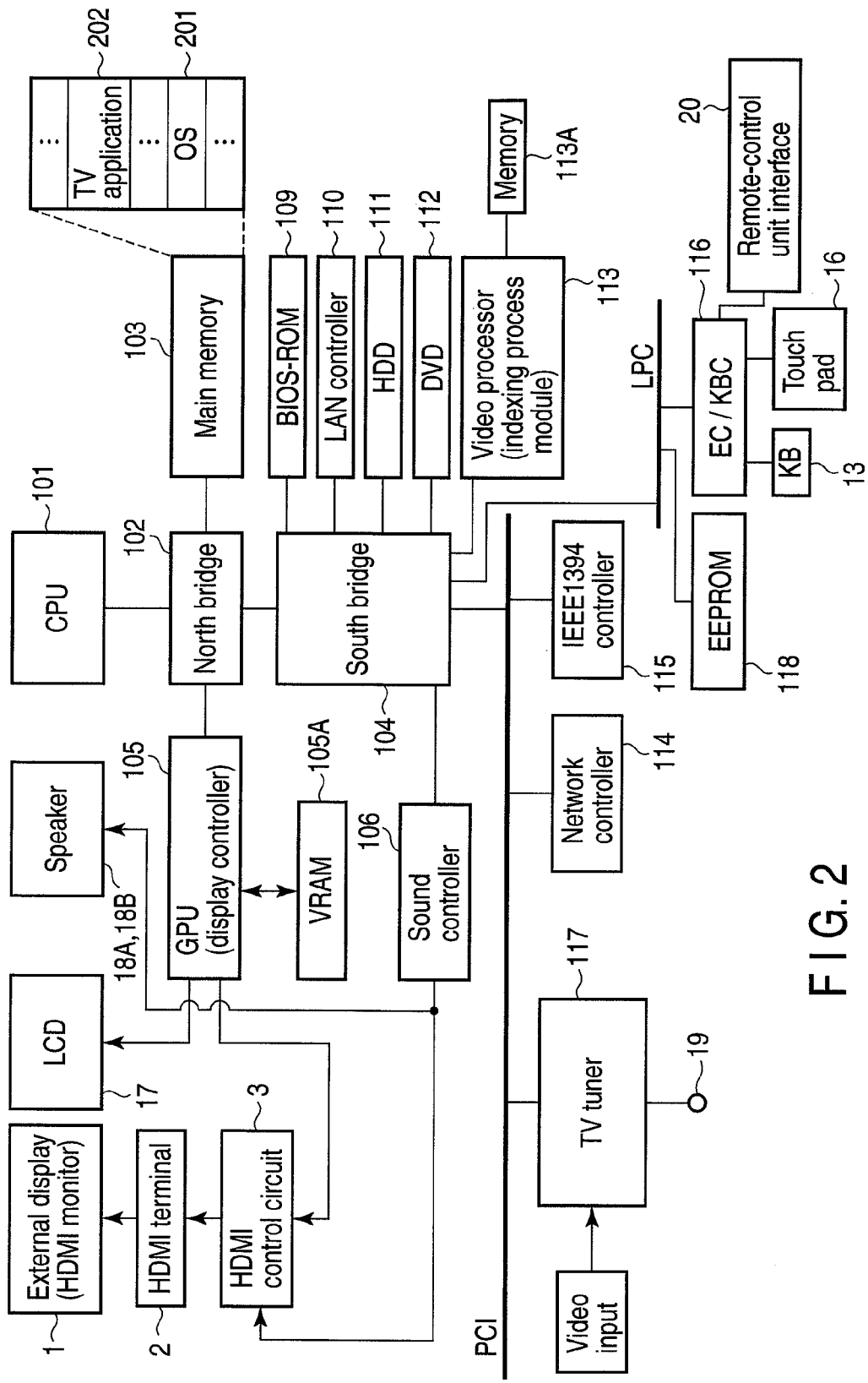
FIG. 2 is an exemplary block diagram showing an example of the system configuration of the electronic apparatus according to the embodiment.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data (moving picture data) such as broadcast program data and video data which is input from an external device. Specifically, the personal computer 10 has a television (TV) function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has a face image list display function for displaying, for instance, a list of face images of persons who appear in video content data (moving picture data), such as video data and broadcast program data, which is stored in the personal computer 10. This face image list display function is implemented, for example, as one of functions included in the TV function. The face image list display function is one of video indexing functions for presenting to a user, for instance, the outline of video content data which is selected by the user as an object of navigation. This face image list display function can present, to the user, which persons appear in which time zones in the whole video content data that is the object of navigation. In addition, the face image list display function can display a list of persons, with attention being paid to a predetermined attribute section included in the video content data.

Further this face image list display function can display a list of thumbnail images corresponding to a plurality of frames which are extracted from the video content data at equal time intervals.

The personal computer 10 has a deletion decision support function for supporting a user operation relating to the deletion of video content data (moving picture data). This deletion decision support function is a function of presenting to the user the outline of to-be-deleted moving picture data by using still images (the above-described face images or the above-described thumbnail images) which are composed of a plurality of still images that are extracted from each moving picture data by the face image list display function.

The deletion decision support function displays a list of video content data (moving picture data) which are stored in the personal computer 10. When to-be-deleted video content data is selected by the user from the list of video content data, the deletion decision support function displays a deletion confirmation screen for prompting the user to confirm the deletion/non-deletion of the to-be-deleted video content data. On the deletion confirmation screen, still images (the above-described face images or the above-described thumbnail images), which are extracted from the to-be-deleted video content data, are displayed in an arranged fashion, for example, in the order of appearance of the still images.

The deletion confirmation screen may display all still images corresponding to the to-be-deleted video content data, or may display only still images which appear in a previously played-back section (played-back scene) in a sequence from the start to end of the to-be-deleted video content data. Thereby, the still images, which are useful in deciding the deletion/non-deletion of the to-be-deleted video content data, can be presented to the user. Besides, all still images corresponding to the to-be-deleted video content data may be displayed on the deletion confirmation screen, and those ones of all still images, which appear in a previously played-back section (played-back scene), may be displayed with emphasis.

FIG. 1 is a perspective view that shows the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening of broadcast program data/video data, recording of broadcast program data/video data, and playback of recorded broadcast program data/video data). In addition, a remote-control unit interface module 20, which executes communication with a remote-control unit that remote-controls the TV function of the computer 10, is provided on a front surface of the computer main body 11. The remote-control unit interface module 20 is composed of, e.g. an infrared signal receiving module.

An antenna terminal 19 for TV broadcast is provided, for example, on a right side surface of the computer main body 11. In addition, for example, on a rear surface of the computer main body 11, there is provided an external display connection terminal corresponding to, e.g. the high-definition multimedia interface (HDMI) standard. The external display connection terminal is used to output video data (moving picture data), which is included in video content data such as broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a network controller 114 such as a wireless LAN controller, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HDD) 111 into the main memory 103. The TV application program 202 is software for executing the TV function. The TV application program 202 executes, for example, a live playback process for viewing/listening to broadcast program data which is received by the TV tuner 117, a recording process for recording received broadcast program data in the HDD 111, and a playback process for playing back broadcast program data/video data which is recorded in the HDD 111. The CPU 101 also executes a BIOS (Basic Input/Output System) that is stored in the BIOS-ROM 109. The BIOS is a program for hardware control.

The north bridge 102 is a bridge device that connects a local bus of the CPU 101 and the south bridge 104. The north bridge 102 includes a memory controller that access-controls the main memory 103. The north bridge 102 has a function of executing communication with the GPU 105 via, e.g. a PCI EXPRESS serial bus.

The GPU 105 is a display controller for controlling the LCD 17 that is used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-mentioned external display connection terminal. The HDMI terminal 2 can send a digital audio signal and a non-compressed digital video signal via a single cable to the external display device 1 such as a TV. The HDMI control circuit 3 is an interface for sending the digital video signal to the external display device 1, which is called "HDMI monitor", via the HDMI terminal 2.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

Further, the video processor 113 is connected to the south bridge 104 via, e.g. a PCI EXPRESS serial bus.

The video processor 113 is a processor which executes various processes relating to the above-described video indexing. The video processor 113 functions, for example, as an indexing process module for executing a video indexing process. Specifically, in the video indexing process, the video processor 113 extracts face images of persons from moving picture data which is included in video content data, and outputs, e.g. time stamp information indicating time points at which the extracted face images appear in the video content data. The extraction of face images is executed, for example, by a face detection process for detecting a face region from each frame of the moving picture data which is included in the video content data, and a cut-out process for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of many persons.

Further, the video processor 113 executes, for example, a process of detecting a commercial (CM) section which is included in video content data, and an audio indexing process. In usual cases, the time length of each CM section is set at one of some preset time lengths. In addition, a silent period of a predetermined time length is present before and after the CM section. Thus, in the CM section detection process, for example, audio data included in the video content data is analyzed, and a silent section of a predetermined time length is detected. A section, which is interposed between two successive detected silent sections and has a time length of a predetermined value or more, is detected as a CM section.

The audio indexing process is an indexing process of analyzing audio data which is included in video content data, and detecting a music section in which music is played and a talk section in which a talk is made by a person, which are included in the video content data. In the audio indexing process, for example, the characteristics of the frequency spectrum of audio data are analyzed, and the music section and talk section are detected in accordance with the characteristics of the frequency spectrum. Since the characteristic of the frequency spectrum corresponding to the music section is different from the characteristic of the frequency spectrum corresponding to the talk section, the music section and talk section can be detected by analyzing the characteristics of the frequency spectrum. In addition, a section having a frequency spectrum characteristic (acoustic characteristic), in which the characteristic of the frequency spectrum corresponding to the music section and the characteristic of the frequency spectrum corresponding to the talk section are mixed, can be detected as an overlap section in which the music section and the talk section overlap.

Furthermore, the audio indexing process executes a cheer level detection process of detecting a cheer level in each partial data (data of a fixed time length) in video content data, and an excitement level detection process of detecting an excitement level in each partial data in video content data.

The cheer level is indicative of a magnitude of cheer. Cheer is a sound in which voices of many people are combined. The sound in which voices of many people are combined has a distribution of a specific frequency spectrum. In the cheer level detection process, the frequency spectrum of audio data included in video content data is analyzed, and a cheer level of each partial data is detected in accordance with an analysis result of the frequency spectrum. The excitement level is a volume level of a section in which a volume level of a certain fixed level or more occurs continuously for a predetermined time length or more. For instance, a volume level of a sound, such as relatively great applause or loud laugh, is the excitement level. In the excitement level detection process, the distribution of the volume of audio data included in video content data is analyzed, and the excitement level of each partial data is detected in accordance with the analysis result. In the meantime, the volume level itself is usable as the excitement level.

The memory 113A is used as a working memory of the video processor 113. A great deal of arithmetic operations is required for executing the indexing process (the CM detection process, video indexing process and audio indexing process). In the present embodiment, the video processor 113, which is a dedicated processor and differs from the CPU 101, is used as a back-end processor, and the video processor 113 executes the indexing process. Therefore, the indexing process can be executed without increasing the load on the CPU 101. Since the CM detection process can be executed by analyzing audio data, as described above, the CM detection process is treated as one of processes of the audio indexing process in the description below.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground digital TV broadcast program data. The TV tuner 117 also has a function of capturing video data which is input from an external device.

Next, referring to FIG. 3, a description is given of a face image list display function which is executed by the TV application program 202.

The indexing process (video indexing process and audio indexing process) for video content data such as broadcast program data is executed by the video processor 113 that functions as the indexing process module, as described above.

Under the control of the TV application program 202, the video processor 113 executes the indexing process, for example, for video content data, such as recorded broadcast program data, which is designated by the user. In addition, the video processor 113 can execute, in parallel with the recording process for storing in the HDD 111 broadcast program data which is received by the TV tuner 117, the indexing process for this broadcast program data.

In the video indexing process (also referred to as "face image indexing process"), the video processor 113 analyzes, in units of a frame, moving picture data that is included in video content data. The video processor 113 extracts face images of persons from a plurality of frames which constitute moving picture data, and outputs time stamp information indicating time points at which the extracted face images appear in the video content data. As the time stamp information corresponding to each face image, use may be made of, for instance, an elapsed time from the start of video content data to the appearance of the face image, or the frame number of a frame from which the face image is extracted.

Further, the video processor 113 outputs a size (resolution) of each of the extracted face images. The face detection result data (face image, time stamp information TS, and size), which is output from the video processor 113, is stored in a database 111A as face image indexing data. The database 111A is a memory area which is provided in the HDD 111 for storing indexing data.

In the video indexing process, the video processor 113 further executes a thumbnail image acquisition process in parallel with the face image extraction process. A thumbnail image is an image (a reduced image) corresponding to each of a plurality of frames which are extracted, for example, at equal time intervals from the video content data. Specifically, the video processor 113 successively extracts frames, for example, at predetermined equal time intervals from the video content data, regardless of whether the frames include face images or not, and outputs images (thumbnail images) corresponding to the extracted frames and the time stamp information TS indicative of time points at which the thumbnail images appear. The thumbnail image acquisition result data (thumbnails, time stamp information TS), which is output from the video processor 113, is also stored in the database 111A as thumbnail indexing data.

Further, in the video indexing process, a face image classification process is also executed to classify the plural extracted face images into a plurality of face image groups on a person-by-person basis. Face images belonging to a certain face image group, that is, face images corresponding to the same person, are associated with an identifier (ID) which identifies this face image group, i.e. this person.

In the audio indexing process, the video processor 113 analyzes acoustic characteristics of audio data which is included in the video content data, detects a plurality of kinds of attribute sections (CM section, music section, and talk section) which are included in the video content data, and outputs section attribute information which defines the time points of the start and end of each detected attribute section. The section attribute information can be composed, for example, in association with each attribute section, of time information indicative of the start time point and end time point of each attribute section. Alternatively, the section attribute information may be composed of information indicative of the start time point of the attribute section and information indicative of the time length of the attribute section.

This section attribute information is stored in the database 111A as attribute detection result information. Further, in the audio indexing process, the video processor 113 executes the above-described cheer level detection process and the excitement level detection process. The result of the cheer level detection process and the result of the excitement level detection process are also stored in the database 111A as part of the above-described attribute detection result information.

As is shown in FIG. 4, the attribute detection result information (section attribute information) is composed of, for example, a CM section table, a music section table, a talk section table and a cheer/excitement level table.

The CM section table stores CM section attribute information which is indicative of a start time point and an end time point of a detected CM section. In a case where a plurality of CM sections are present in a sequence from a start position to an end position of video content data, the CM section attribute information corresponding to these plural CM sections is stored in the CM section table. The CM section table stores start time information and end time information, which are indicative of the start time point and end time point of each of the detected CM sections.

The music section table stores music section attribute information which is indicative of a start time point and an end time point of a detected music section. In a case where a plurality of music sections are present in a sequence from a start position to an end position of video content data, the music section attribute information corresponding to these plural music sections is stored in the music section table. The music section table stores start time information and end time information, which are indicative of the start time point and end time point of each of the detected music sections.

The talk section table stores talk section attribute information which is indicative of a start time point and an end time point of a detected talk section. In a case where a plurality of talk sections are present in a sequence from a start position to an end position of video content data, the talk section attribute information corresponding to these plural talk sections is stored in the talk section table. The talk section table stores start time information and end time information, which are indicative of the start time point and end time point of each of the detected talk sections.

The cheer/excitement level table stores a cheer level and an excitement level in each partial data of a predetermined time length (time segments T1, T2, T3, ... ) in video content data.

As is shown in FIG. 3, the TV application program 202 includes a face image list display process module 301 for executing the face image list display function. The face image list display process module 301 is realized, for example, as an indexing viewer program, and displays an indexing view screen for presenting the outline of video content data, by using indexing information (e.g. face image indexing information, thumbnail indexing information, and section attribute information) stored in the database 111A.

Specifically, the face image list display process module 301 reads out the face image indexing information (face images, time stamp information TS, and size) from the database 111A, and displays, with use of the face image indexing information, a list of face images of persons, who appear in the video content data, on a two-dimensional display area (hereinafter referred to as "face thumbnail display area") on the indexing view screen. In this case, the face image list display process module 301 divides a total time length of video content data into a plurality of time zones, for example, at equal time intervals, and selects a predetermined number of face images appearing in each time zone from the extracted face images. The face image list display process module 301 arranges and displays the selected predetermined number of face images, in units of a time zone.

Specifically, the two-dimensional face thumbnail display area includes a plurality of face image display areas which are arranged in a matrix including a plurality of rows and a plurality of columns. A plurality of time zones, which constitute the total time length of the video content data, are allocated to the plural columns, respectively. To be more specific, to the respective columns, allocated are a plurality of time zones each having the same time length, which are obtained by dividing the total time length of the video content data at equal intervals by the number of these columns. Needless to say, the time zone allocated to each column may not necessarily have the same time length. On the basis of the time stamp information TS corresponding to each face image, the face image list display process module 301 displays face images, which belong to the time zone allocated to each column, on the same number of face image display areas as the number of rows belonging to each column, for example, by arranging the face images in the order of frequency of appearance of face images (in the order of detection time length of face images). In this case, for example, the same number of face images as the number of rows are selected, in the order of frequency of appearance, from the face images belonging to the time zone allocated to each column, and the selected face images are arranged from above to below in the order of frequency of appearance. Needless to say, the face images appearing in the time zone allocated to each column may be displayed, not in the order of frequency of appearance, but in the order of appearance of face images.

By this face image list display function, it becomes possible to easily understandably present, to the user, which persons appear in which time zones in the whole video content data. Specific structure examples of the face thumbnail display area will be described later with reference to FIG. 7 and the following Figures.

In addition, the face image list display process module 301 reads out the thumbnail indexing information (thumbnails, time stamp information TS) from the database 111A, and displays, with use of the thumbnail indexing information, the thumbnail images on a thumbnail display area (hereinafter referred to as "bellows thumbnail display area") which is disposed on one of a lower side and an upper side of the face thumbnail display area, by arranging the thumbnail images in line in the order of time of appearance.

Depending on video content data, there is a time zone in which no face image appears. Thus, by displaying the bellows thumbnail display area as well as the face thumbnail display area on the indexing view screen, it is possible to present to the user the content of video content data in the time zone in which no face image appears.

Further, the face image list display process module 301 reads out the section attribute information (CM section attribute information, music section attribute information, talk section attribute information) from the database 111A, and displays, on the basis of the section attribute information, a section bar, which includes bar areas indicative of positions (sections from start time points to end time points) of the attribute sections (CM section, music section, talk section) in the sequence from the start position to the end position of the video content data, on one of a lower side and an upper side of the face thumbnail display area on the indexing view screen.

By displaying the section bar on the indexing view screen, it becomes possible to present, to the user, in which attribute section (CM section, music section, talk section) a person corresponding to each face image in the face thumbnail display area appears. Therefore, the user can find a data position in the entire video content data, from which playback is to be started, by considering the appearing persons and section attributes.

In addition, the face image list display process module 301 reads out the cheer level information and excitement level information from the database 111A, and displays, on the basis of the cheer level information and excitement level information, graphs which indicate a variation in cheer level and a variation in excitement level in the sequence from the start position to the end position of the video content data, on a level display area which is disposed on one of a lower side and an upper side of the face thumbnail display area on the indexing view screen.

By viewing this level display area, the user can understand in which part of the video content data a section in which loud cheer occurs is present, and in which part of the video content data a section in which great excitement occurs is present. The user can find a data position in the entire video content data, from which playback is to be started, by considering the appearing persons, section attributes, cheer level and excitement level.

Figure 5:
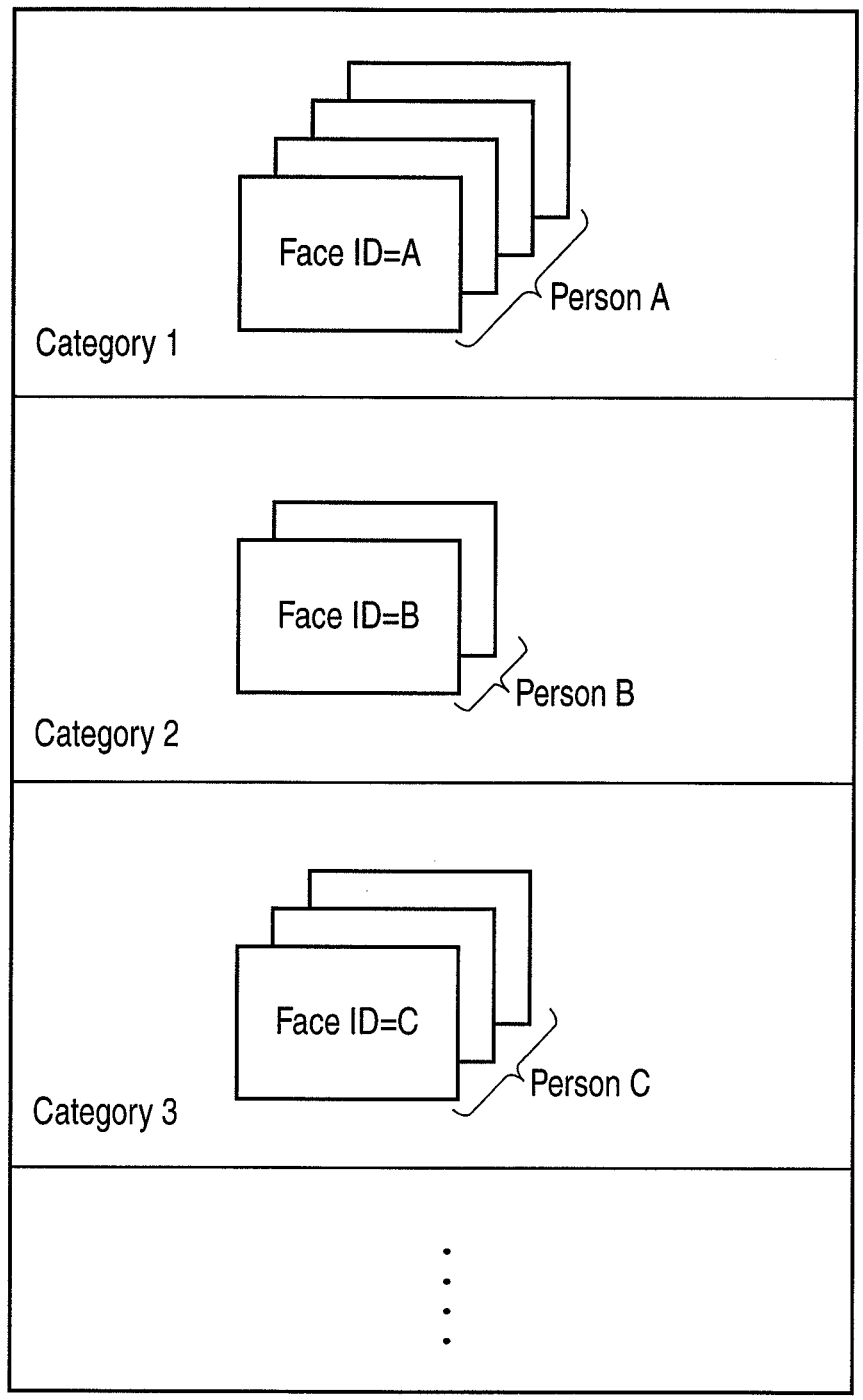
FIG. 5 shows examples of face image groups which are used in the electronic apparatus according to the embodiment.

FIG. 5 shows the relationship between some face image groups, which are obtained by classifying a plurality of face images according to the face image classification process, and IDs (face IDs) corresponding to the face image groups.

The video processor 113 executes, on the basis of the correlation of characteristic data between face images that are extracted from the moving picture data of certain video content data, the face image classification process for classifying the face images, which correspond to the same person, into the same category. In the face image classification process, the face images having similar characteristics are classified into the same category (the same face image group). As shown in FIG. 5, the same ID (face ID) is given to the face images which correspond to the same person. In FIG. 5, a category 1 indicates a group of face images of a person A, a category 2 indicates a group of face images of a person B, and a category 3 indicates a group of face images of a person C. Each of the face images belonging to the category 1 is associated with an ID (face ID=A) for identifying the person A. Each of the face images belonging to the category 2 is associated with an ID (face ID=B) for identifying the person B.

Each of the face images belonging to the category 3 is associated with an ID (face ID=C) for identifying the person C.

Figure 6:
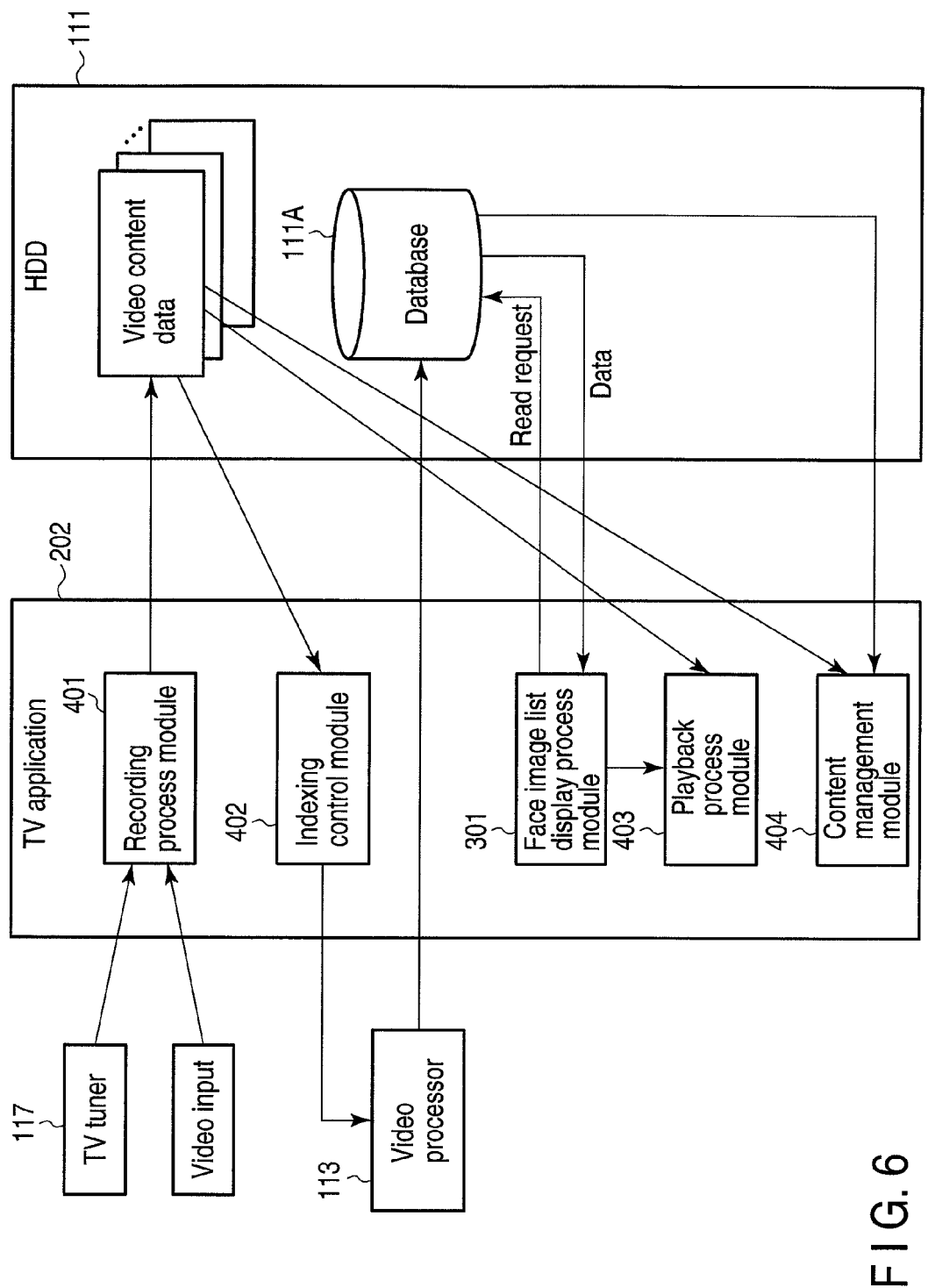
FIG. 6 is an exemplary block diagram showing the functional configuration of a program which is used in the electronic apparatus according to the embodiment.

Next, referring to FIG. 6, the functional configuration of the TV application program 202 is described.

The TV application program 202 includes, in addition to the above-described face image list display process module 301, a recording process module 401, an indexing control module 402, a playback process module 403 and a content management module 404.

The recording process module 401 executes a recording process for recording in the HDD 111 broadcast program data which is received by the TV tuner 117 or video data which is input from an external device. In addition, the recording process module 401 executes a programmed-recording process for receiving, with use of the tuner 117, broadcast program data which is designated by programmed-recording information (channel number, date/time) that is preset by the user, and recording the associated broadcast program data in the HDD 111.

The indexing control module 402 controls the video processor (indexing process module) 113 and causes the video processor 113 to execute the indexing process (video indexing process, audio indexing process). The user can designate whether the indexing process is to be executed or not, in association with each broadcast program data that is to be recorded. For example, as regards broadcast program data to be recorded, for which execution of the indexing process has been instructed, the indexing process is automatically started in parallel with the process of recording the broadcast program data in the HDD 111. Besides, the user may designate video content data, from among the video content data already stored in the HDD 111, for which the indexing process is to be executed.

The playback process module 403 executes a process for playing back each video content data stored in the HDD 111. In addition, when a playback request event is input by a user operation in the state in which one of face images in the face image list of certain video content data is selected, the playback process module 403 can start playback of the video content data from a time point corresponding to a position in the video content data, at which the selected face image appears.

The user can determine, while viewing the face image list, the position at which the playback of video content data is to be started. Thus, by selectively designating an arbitrary one of face images in the face image list, the user can view/listen to, for instance, only one or more scenes in which a person, in whom the user is interested, appears.

The indexing process may not necessarily be executed by the video processor 113. For example, the TV application program 202 may be provided with a function of executing the indexing process. In this case, the indexing process is executed by the CPU 101 under the control of the TV application program 202.

The content management module 404 manages the video content data that is stored in the HDD 111. The content management module 404 executes a process of displaying a content list screen for displaying a list of video content data that is stored in the HDD 111, and the above-described deletion decision support function. For example, when to-be-deleted video content data is selected from the content list screen by the user, the content management module 404 displays a deletion confirmation screen on which still images (face images or thumbnail images) that are extracted from the to-be-deleted video content data are arranged in the order of time of appearance of the still images, thereby to present the outline of the to-be-deleted video content data to the user.

Figure 7:
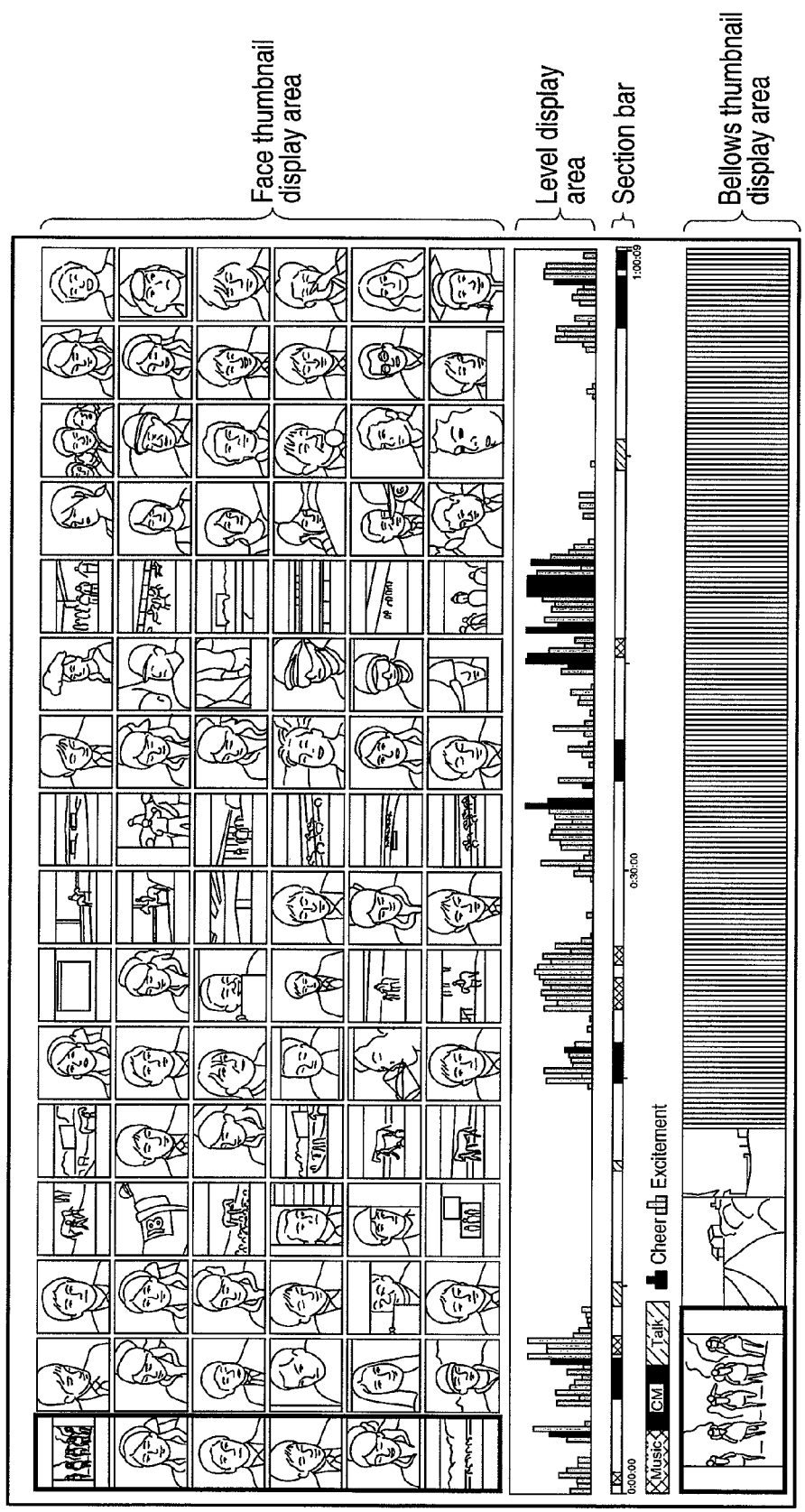
FIG. 7 shows an example of an indexing view screen which is displayed on a display device by the electronic apparatus according to the embodiment.
Figure 8:
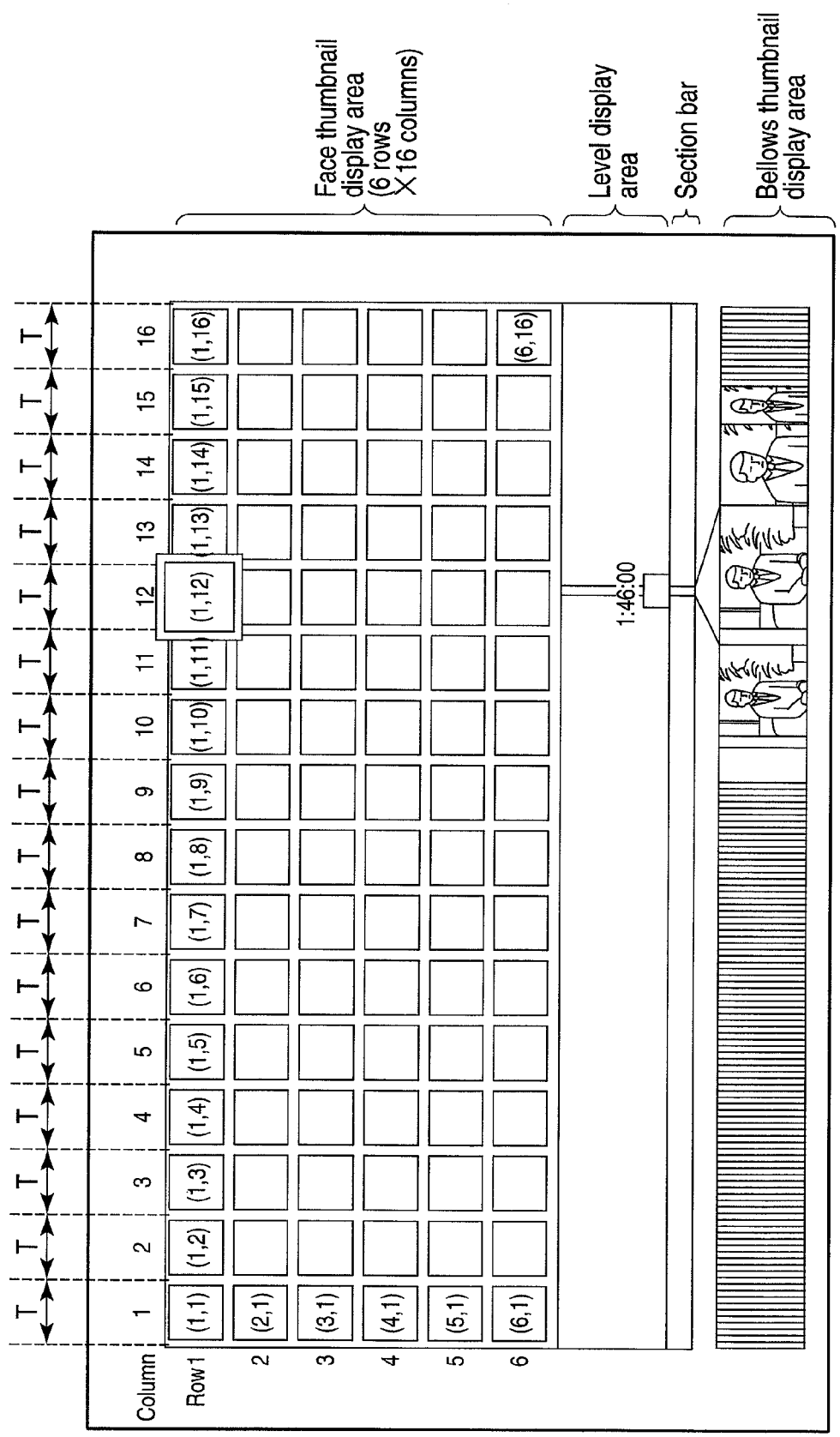
FIG. 8 shows a structure example of a face thumbnail display area which is included in the indexing view screen shown in FIG. 7.

Next, referring to FIG. 7 and FIG. 8, concrete structures of the indexing view screen are described.

FIG. 7 shows an example of an indexing view screen which is displayed on the LCD 17 by the face image list display process module 301. The indexing view screen is a screen which is obtained by subjecting certain video content data (e.g. broadcast program data) to the indexing process. The indexing view screen includes the above-described face thumbnail display area for displaying the list of face images, the above-described level display area, the above-described section bar, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes. FIG. 7 shows a case in which a thumbnail image, which is positioned at the left end, is selected.

The face image list display process module 301 displays a thumbnail image, which is selected by a user operation, with a first lateral width size, and displays other thumbnail images with a second lateral width size that is smaller than the first lateral width size. Specifically, the selected thumbnail image is displayed with the first lateral width size, some thumbnail images in the vicinity of the selected thumbnail image are displayed with a reduced lateral width, and the other thumbnail images are displayed with a more reduced lateral width. A rectangular frame may be added to the selected thumbnail image.

The level display area displays a graph (a graph shown in a dense color in FIG. 7) indicating a variation of the cheer level, and a graph (a graph shown in a light color in FIG. 7) indicating a variation of the excitement level.

The section bar indicates the positions of the talk section, music section and CM section. In the section bar, a bar area in a certain color (a black strip area in FIG. 7) is displayed at a position of each CM section. A bar area in another color (a cross-hatched strip area in FIG. 7) is displayed at a position of each music section. A bar area in still another color (a hatched strip area in FIG. 7) is displayed at a position of each talk section. The user can select one of the bar areas of the section bar by operating a button of the remote-control unit, or an upward, downward, leftward or rightward cursor key.

The face thumbnail display area displays a list of a plurality of face images. In the case where no face image is detected during a predetermined continuous time period, a thumbnail image of the entire frame may be displayed on the face thumbnail display area. In addition, a thumbnail image of the entire frame may be displayed on the face thumbnail display area at a point of change of scenes.

FIG. 8 shows an example of the structure of the face thumbnail display area.

The face thumbnail display area includes a plurality of face image display areas which are arranged in a matrix including a plurality of rows and a plurality of columns. In FIG. 8, the face thumbnail display area comprises 6 rows×16 columns. The number of face image display areas included in the face thumbnail display area is 96.

A plurality of time zones, each having the same time length T, are allocated to columns 1 to 16, respectively. The time length T is obtained by dividing the total time length of video content data by the number of columns (16) at equal time intervals.

For example, if the total time length of video content data is two hours, the two hours are divided into 16 time zones at equal time intervals. In this case, the time length T of each time zone is 7.5 minutes. For example, a time zone from 0:00:00 to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

Needless to say, the length of the time zone, which is allocated to each of the plural columns, may not necessarily be equal.

On the basis of time stamp information corresponding to face images which are extracted by the video processor 113, the face image list display process module 301 displays the face images, which belong to the time zone allocated to each column, on the six face image display areas of the associated column by arranging the face images, for example, in the above-described order of frequency or in the order of appearance. In this case, the face image list display process module 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, use is made of a time axis having a base point at a left end position (1, 1) and an end point of video content data at a right end position (6, 16).

The user can select the size of the face image, which is displayed on each face image display area of the face thumbnail display area, from among "large", "medium" and "small". The number of rows and the number of columns are varied in accordance with the size of the face image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non-selected "standard" state and a selected "focus" state. The size of the face image in the "focus" state is set to be greater than the size of the face image in the "standard" state (180×180, 90×90, or 60×60). FIG. 8 shows the case in which the face image at coordinates (1, 12) is in the "focus" state.

The number of thumbnail images, which are displayed in the bellows thumbnail display area, is set at one of 240, 144, 96 and 48 in accordance with the user setting. The default value is, e.g. 240.

The thumbnail image is set in one of two states, namely, a non-selected "standard" state and a selected "focus" state. The size of the thumbnail image in the "focus" state is set to be greater than the size of the other thumbnail images.

Figure 9:
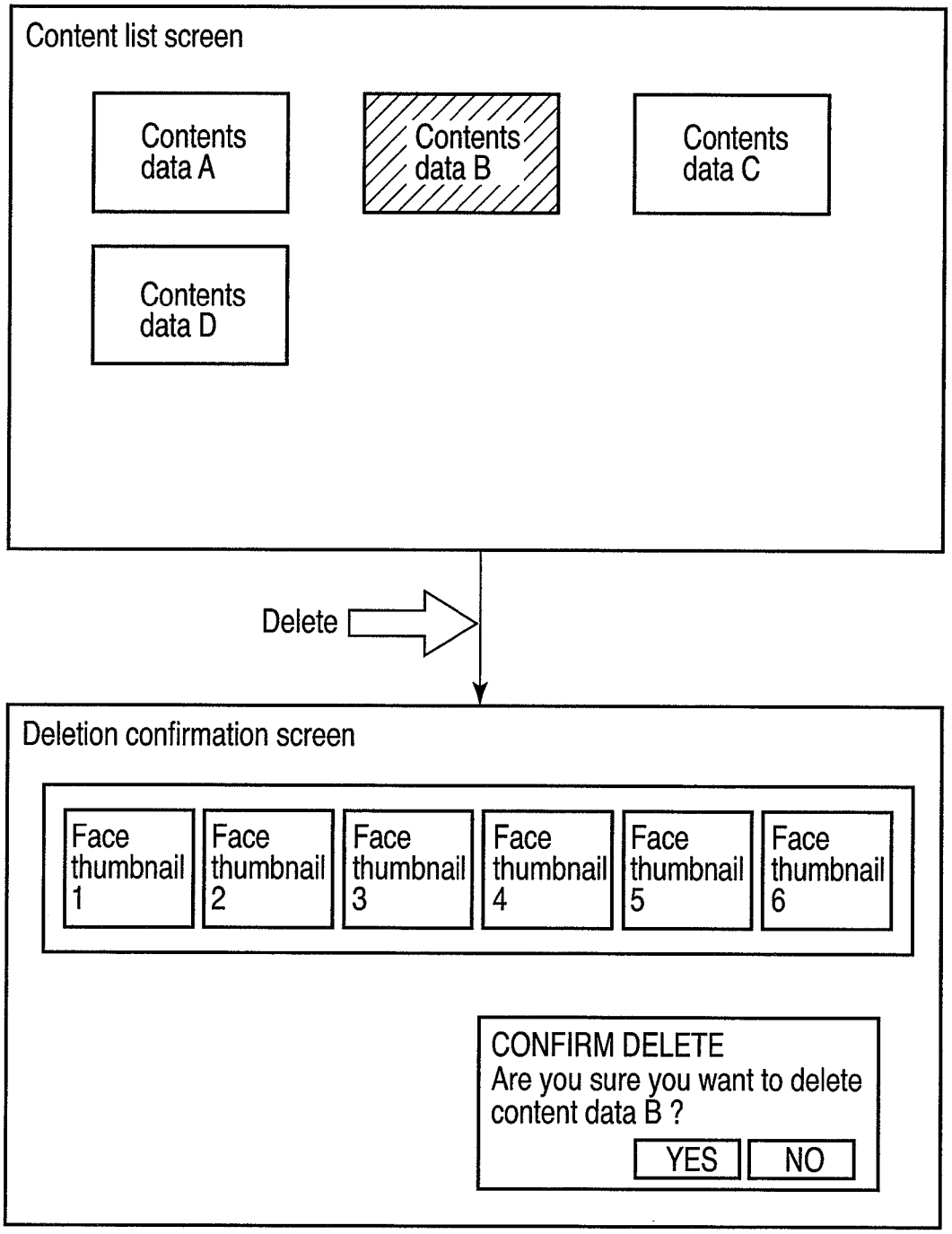
FIG. 9 is an exemplary view for describing a deletion confirmation function of the electronic apparatus according to the embodiment.

Next, referring to FIG. 9, the deletion confirmation process, which is executed by the content management module 404, is described.

When the display of the list of video content data has been requested by the user, or when the deletion of content has been requested by the user, the content management module 404 displays a content list screen, as shown in the upper part of FIG. 9, on the display screen of the LCD 17. If the HDD 111 stores video content data A, video content data B, video content data C and video content data D, the content management module 404 displays, on the content list screen, for instance, thumbnail images corresponding to the video content data A, B, C and D, or folder icons corresponding to the video content data A, B, C and D. Besides, file titles or program titles of the respective video content data may be displayed in association with the thumbnail images or folder icons.

When one of the video content data A, B, C and D has been selected as to-be-deleted video content data by the user operation of the remote-control unit or the keyboard 13, the content management module 404 displays a deletion confirmation screen, as shown in the lower part of FIG. 9, on the display screen of the LCD 17. The deletion confirmation screen displays a list of face images (face thumbnail images) corresponding to the to-be-deleted video content data, and a deletion confirmation dialogue. This deletion confirmation dialogue displays a message for prompting the user to confirm whether the to-be-deleted video content data may be deleted, and also displays a "YES" button and a "NO" button.

For example, in the case where the video content data B is selected by the user as to-be-deleted video content data from the content list screen, the content management module 404 acquires face images (face thumbnail images) corresponding to the video content data B from the database 111, displays the acquired face images on the deletion confirmation screen, and displays the deletion confirmation dialog on the deletion confirmation screen. The face images (face thumbnail images) corresponding to the video content data B are arranged, for example, in the order of appearance of the face images.

The deletion confirmation screen may display all face images corresponding to the to-be-deleted video content data, or may display only the face images appearing in each section (each played-back scene) which was played back in the past in the sequence from the start to the end of the to-be-deleted video content data. In this manner, by considering the past playback history by the user, the face images, which are useful in order for the user to decide the deletion/non-deletion of the to-be-deleted video content data, can efficiently be displayed on the deletion confirmation screen.

Besides, in the state in which all face images corresponding to the to-be-deleted video content data are displayed on the deletion confirmation screen, only each of the face images in all face images, which appear in the previously played-back section (played-back scene), may be displayed with emphasis.

Figure 10:
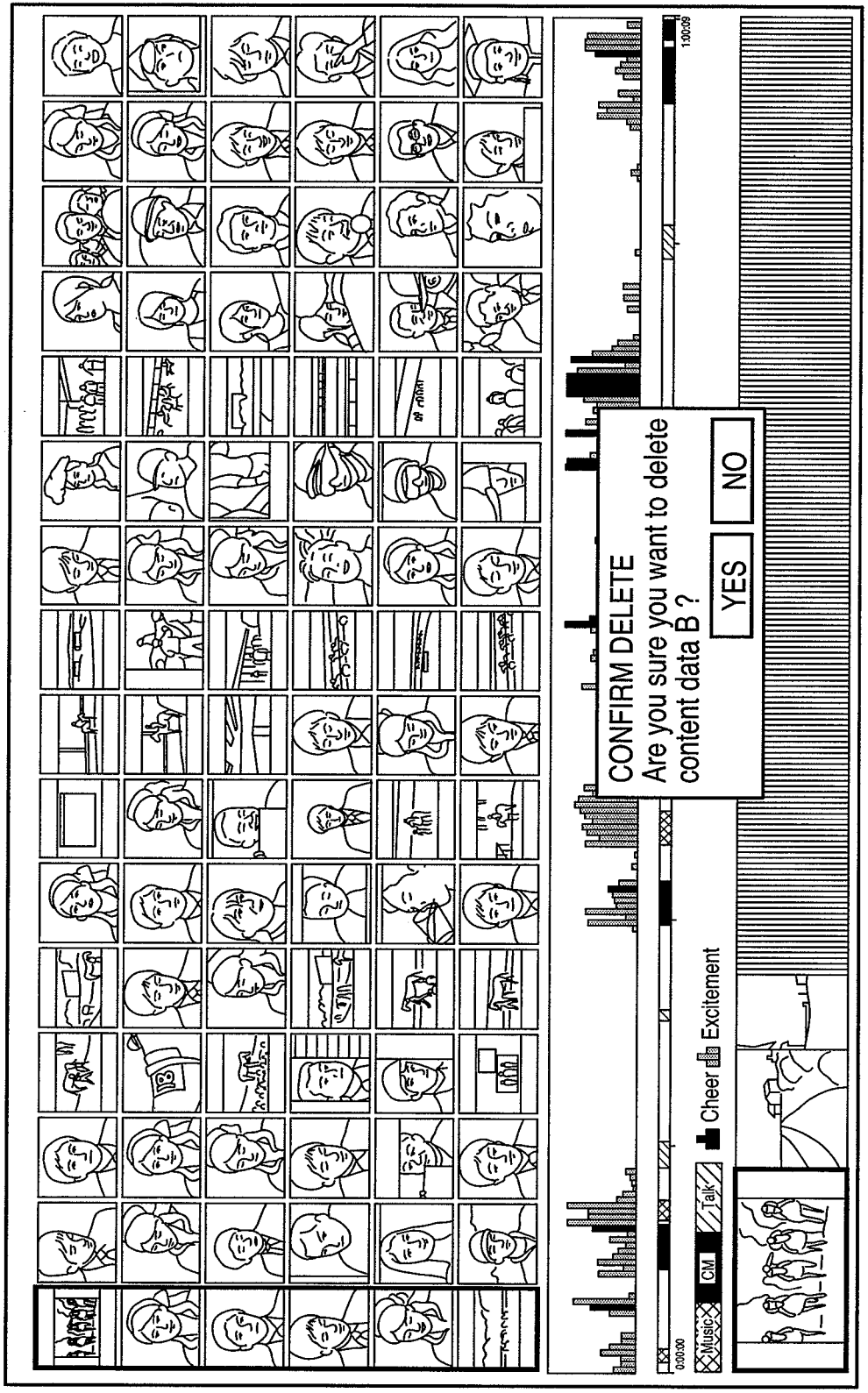
FIG. 10 shows an example of a deletion confirmation screen which is used in the deletion confirmation function of the electronic apparatus according to the embodiment.

FIG. 10 shows an example of the deletion confirmation screen, which makes use of the index view screen that has been described with reference to FIG. 7.

When the user has executed an operation for designating the deletion of certain video content data on the content list screen that is shown in the upper part of FIG. 9, the content management module 404 displays the screen of FIG. 10 as the deletion confirmation screen on the display screen of the LCD 17.

The deletion confirmation screen of FIG. 10 is composed of the index view screen of FIG. 7 and a deletion confirmation dialog which is displayed on the index view screen. The entirety of the index view screen may not necessarily be used as the deletion confirmation screen, and only the face thumbnail display area in the index view screen may be used for the display of the deletion confirmation screen. In this case, the deletion confirmation screen is composed of the face thumbnail display area and the deletion confirmation dialog.

Alternatively, only specified face images in the face images displayed in the face thumbnail display area may be displayed. In this case, as the specified face images, use may be made of the face images appearing in a previously played-back section (played-back scene) in the sequence from the start to the end of the to-be-deleted video content data. The content management module 404 manages, as playback history information, information indicative of a section (played-back section) in which each of video content data was played back, or information indicative of face images appearing in the played-back section. Using this playback history information, the content management module 404 selects face images, which belong to the previously played-back section (scene), from the face images corresponding to the to-be-deleted video content data. The content management module 404 displays only the selected face images on the deletion confirmation screen.

In the case where the face thumbnail list, which is displayed in the face thumbnail display area, is used for the display of the deletion confirmation screen, it may be possible to display, in a first display mode (emphasis display mode), the face images belonging to the previously played-back section (played-back scene) in the face images displayed in the face thumbnail display area, and to display the other face images in a second display mode such as a standard display mode. The first display mode is a display mode for displaying predetermined face images with emphasis. Examples of the emphasis display mode of face images include (1) addition of a frame to face images, and (2) enlargement of the size of face images.

In the present embodiment, an arbitrary face image on the indexing view screen, which has been selected by the user, is used as a trigger for starting the playback process, and the video content data can be played back from a time point at which this face image appears. Accordingly, in the present embodiment, the face image, which was previously used as a trigger for starting the playback process, that is, the face image, which was previously selected as a reference of the time point for starting playback, can be used as the face image which appears in the previously played-back section (played-back scene). In this case, the content management module 404 stores and manages, as playback history information, the identifier for identifying the face image (or the ID (face ID) of the person corresponding to the face image) that was used as the trigger for the playback of each of video content data. On the basis of the playback history information, the content management module 404 selects each face image, which was previously used as the reference of the time point for starting playback, from the face images corresponding to the to-be-deleted video content data, and displays each selected face image on the deletion confirmation screen as the face image appearing in the played-back scene.

It is thus possible to present to the user each face image which was previously selected by the user as the trigger for playback. In many cases, a face image that was selected as the trigger for playback is a face image in which the user is interested. Thus, by displaying on the deletion confirmation screen each face image which was previously used as the trigger for playback, it becomes possible to efficiently present to the user the face image that is useful in deciding the deletion/non-deletion of to-be-deleted video content data.

Besides, it may be possible to display not only the face image that was previously actually used as the trigger for playback, but also all the face images belonging to the same group as this face image, on the deletion confirmation screen as the face images of the person appearing in the played-back scene. In this case, the content management module 404 selects the face image, which was previously used as the trigger for playback, and each face image corresponding to the same person as this face image, from the face images corresponding to the to-be-deleted video content data, and displays each selected face image on the deletion confirmation screen.

In another example for displaying on the deletion confirmation screen the face images appearing in the played-back scene, it may be possible to use a process of preferentially displaying on the deletion confirmation screen a face image with a long total playback time. In this case, the content management module 404 manages, with respect to each face image, the total playback time in which the frame corresponding to the face image was played back by the playback of the to-be-deleted moving picture data. Specifically, the content management module 404 manages, with respect to each face image included in the played-back scene (or each face image group included in the played-back scene), the playback history information for specifying the total time length (total playback time length) in which the frame corresponding to the face image was played back. The face image (or face image group), which is included in a more frequently played-back scene, has a longer total playback time of the face image (or face image group). The content management module 404 selects, from the face images corresponding to the to-be-deleted video content data, a predetermined number of face images with the longest total playback time, and displays the selected face images on the deletion confirmation screen as the face images appearing in the played-back scene.

Figure 11:
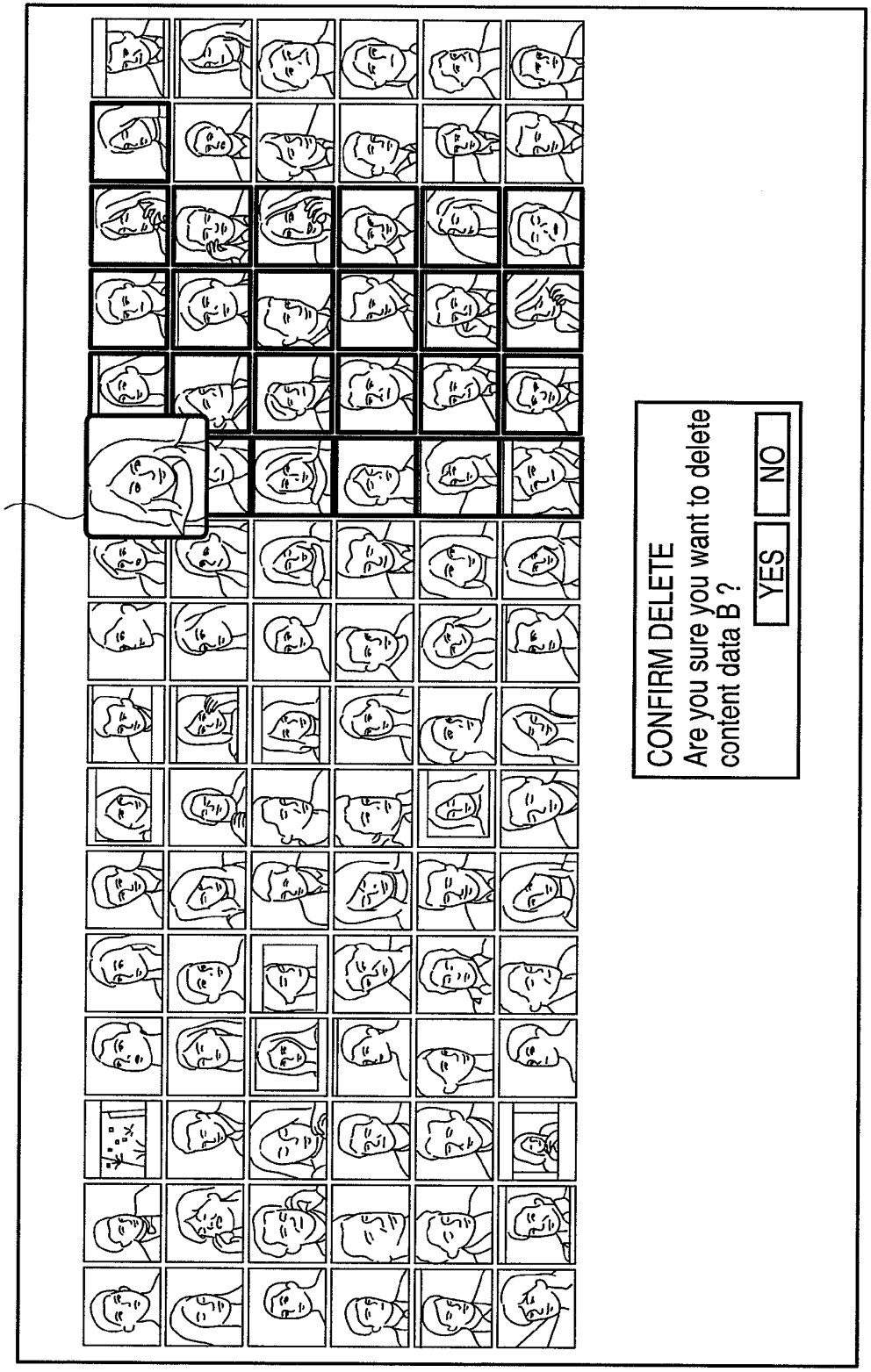
FIG. 11 shows another example of the deletion confirmation screen which is used in the deletion confirmation function of the electronic apparatus according to the embodiment.

FIG. 11 shows another example of the deletion confirmation screen which makes use of the index view screen.

The deletion confirmation screen of FIG. 11 is composed of a face image list which is displayed in the face thumbnail display area, and a deletion confirmation dialog. In the face image list, each face image, which appears in the played-back scene, is displayed with emphasis. In the example shown in FIG. 11, a frame is added to each face image which appears in the played-back scene. In addition, a face image (face image B1 in FIG. 11), which was previously selected by the user as a trigger for playback, may be displayed, for example, with a larger size.

Figure 12:
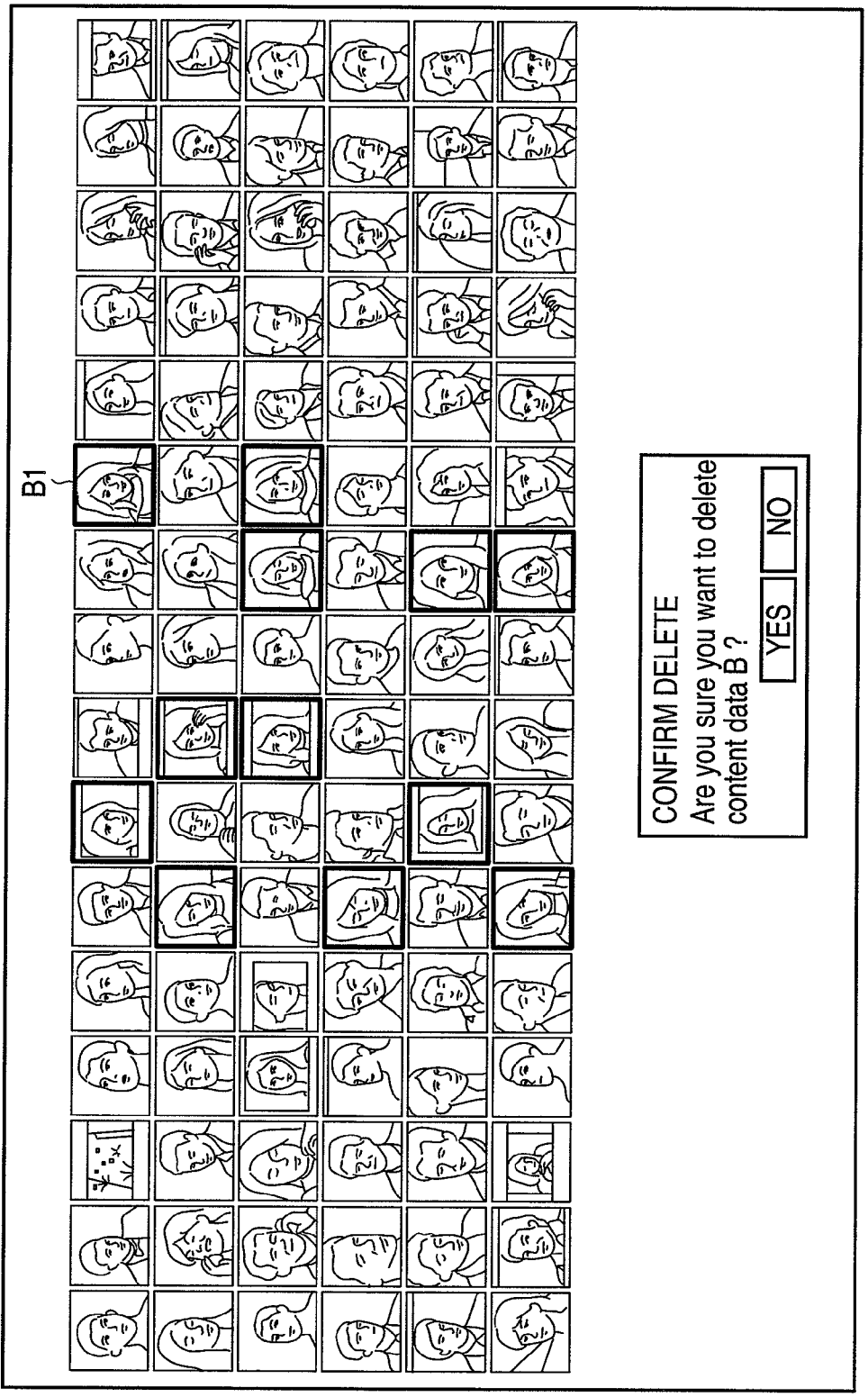
FIG. 12 shows still another example of the deletion confirmation screen which is used in the deletion confirmation function of the electronic apparatus according to the embodiment.

Furthermore, face images belonging to the same face image group as the face image, which was previously selected by the user as the trigger for playback, may be displayed with emphasis. FIG. 12 shows an example of display in this case. In FIG. 12, the face image (face image B1), which was previously selected by the user as the trigger for playback, and the face images belonging to the same face image group as this face image B, are displayed with emphasis. In the case where two face images corresponding to two persons were previously selected by the user as triggers for playback, the face images corresponding to one of the two persons and the face images corresponding to the other person are displayed with emphasis.

Figure 13:
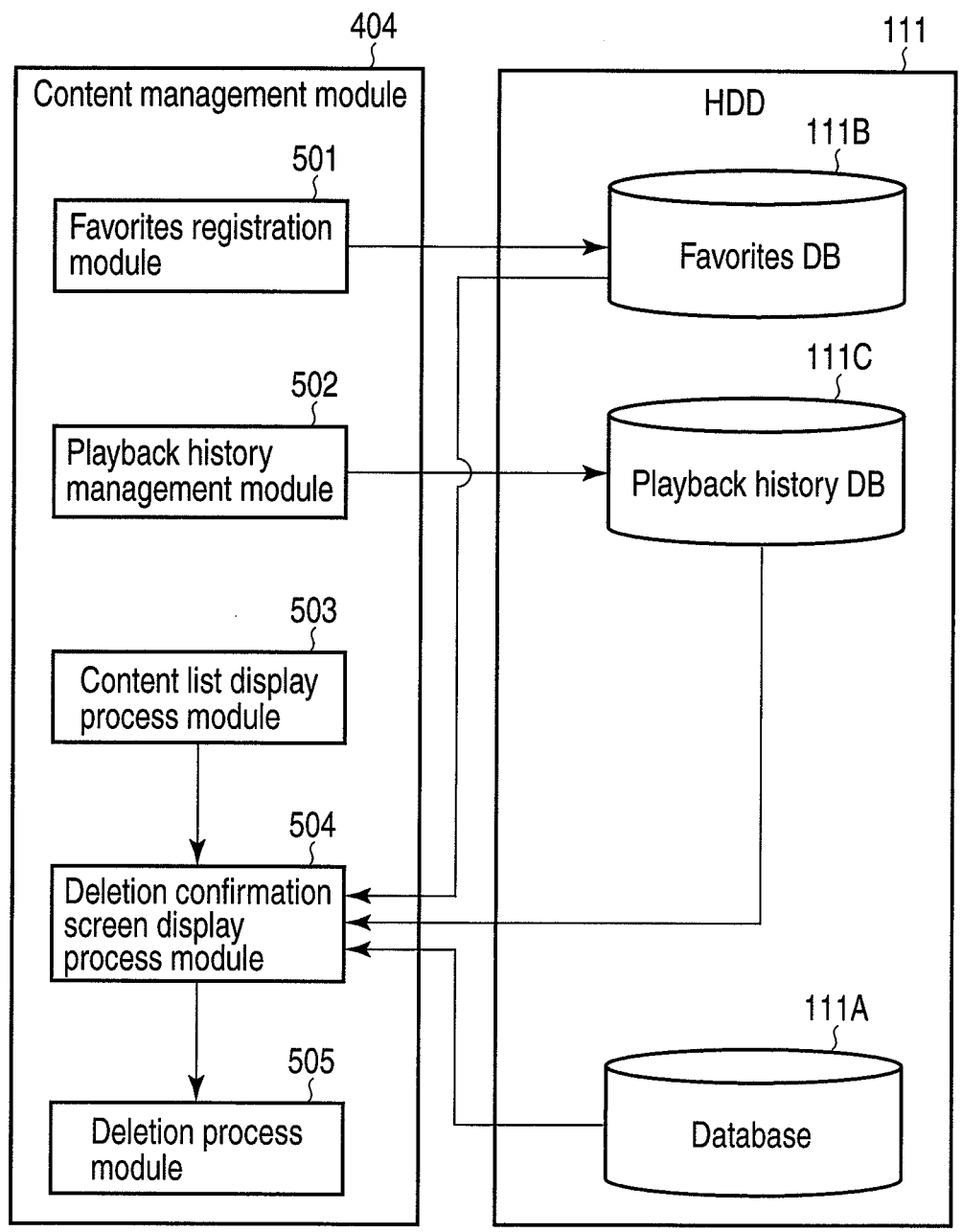
FIG. 13 is an exemplary block diagram showing a structure example of a content management module which is provided in the electronic apparatus according to the embodiment.

Next, referring to FIG. 13, a description is given of a structure example of the content management module 404.

The content management module 404 comprises a favorites registration module 501, a playback history management module 502, a content list display process module 503, a deletion confirmation screen display process module 504 and a deletion process module 505.

The favorites registration module 501 stores in a favorites database 111B one or more face images, which are selected by the user as favorite face images in association with each of video content data. The user can select as a favorite face image an arbitrary face image of the face images which are displayed on the index view screen corresponding to certain video content data. The selected face image is stored in the favorites database 111B.

The playback history management module 502 can manage, as playback history information in connection with each of video content data, a played-back scene, each face image appearing in the played-back scene, a face image that was used as a playback trigger of the played-back scene, and a total playback time of each face image (or each face image group) appearing in the played-back scene. This playback history information is stored in a playback history database 111C. As information indicative of the total playback time, for example, use may be made of the number of times of appearance or the time length of appearance of each face image in the played-back scene. In addition, with respect to each of the face images, the number of times of playback of the frame thereof may be used as information indicative of the total playback time.

The content list display process unit 503 displays a list of video content data that is stored in the HDD 111. When to-be-deleted video content data has been selected by the user from the list of the video content data, the deletion confirmation screen display process unit 504 displays the deletion confirmation screen for prompting the user to confirm whether or not to delete the to-be-deleted video content data. In this case, the deletion confirmation screen display process unit 504 acquires from the database 111A the face images corresponding to the to-be-deleted video content data, and displays the acquired face images on the deletion confirmation screen in an arranged fashion. In this case, by referring to the playback history information in the playback history database 111C, the deletion confirmation screen display process unit 504 can select the face images, which are to be displayed on the deletion confirmation screen (or those ones of the face images displayed on the deletion confirmation screen, which are to be displayed with emphasis), on the basis of the history of the user's playback operations on the to-be-deleted video content data. In addition, the deletion confirmation screen display process unit 504 can acquire from the favorites database 111B favorite face images corresponding to the to-be-deleted video content data, and can display the favorite face images on the deletion confirmation screen.

The deletion process unit 505 deletes the to-be-deleted video content data from the HDD 111 when the YES button in the deletion confirmation dialog on the deletion confirmation screen has been selected by the user operation.

Next, referring to a flow chart of FIG. 14, a description is given of the procedure of the display process which is executed by the face image list display process module 301.

To start with, the face image list display process module 301 sorts face images stored in the database 111A, on the basis of time stamp information corresponding to these face images, in an order of time of appearance (an order of time of occurrence) of the face images (block S101). Then, the face image list display process module 301 determines the number of rows and the number of columns in accordance with a face image size to be displayed, which is designated by the user, and calculates a time zone which is allocated to each column (large section), for example, by equally dividing the total time length of video content data, which is an object of indexing, by the number of columns. Then, the face image list display process module 301 selects that number of face images, which is equal to the number of rows, from the face images belonging to the time zone which is allocated to the column that is the object of the display process (block S102). If the number of face images belonging to the time zone, which is allocated to the column that is the object of the display process, is larger than the number of rows, the face image list display process module 301 may execute a process of preferentially selecting, for example, face images with high frequency of appearance.

In this case, the face image list display process module 301 preferentially selects, from the face images belonging to a time zone allocated to the column that is the object of the display process, face images with high frequency of appearance in this time zone. In addition, in the case where the number of face images belonging to the time zone, which is allocated to the column that is the object of the display process, is larger than the number of rows, the face image list display process module 301 may execute a process of preferentially selecting face images with large sizes, from the face images belonging to the time zone allocated to the column that is the object of the display process, on the basis of size information of each face image which is stored in the database 111A.

The size of a face image, which is extracted from a frame showing a close-up face, is relatively large. Accordingly, as the size of the extracted face image is larger, it is highly possible that the person of the extracted face image is of higher importance. By preferentially selecting a face image with a larger size, it becomes possible to preferentially display a face image of a person who is of higher importance.

Subsequently, the face image list display process module 301 displays selected face images on a plurality of face image display areas in the column that is the object of the display process, for example, by arranging the face images in the order of frequency of appearance or in the order of time of appearance (block S103). A face image with a higher frequency of appearance is displayed on a more upward face image display area.

The process of blocks S102 and S103 is repeatedly executed until the processing on all columns is completed, while the number of the column that is the object of the display process is updated (block S104, S105). As a result, plural image images are displayed in the face image display areas in the display mode.

If the number of face images belonging to the time zone, which is allocated to the column that is the object of the display process, is less than the number of rows, thumbnail images belonging to the corresponding time zone may also be displayed in the column that is the object of the display process.

If the process on all columns is completed (NO in block S104), the face image list display process module 301 displays the thumbnail images, which are stored in the database 111A, on the bellows thumbnail display area on the basis of the time stamp information of the thumbnail images, by arranging the thumbnail images in line in the order of time of appearance of the thumbnail images (block S106).

Thereafter, the face image list display process module 301 reads out the cheer level information and excitement level information from the database 111A, and displays, on the level display area, a graph which indicates a variation in cheer level in the sequence from the start position to the end position of the video content data, and a graph which indicates a variation in excitement level in the sequence, in accordance with the cheer level information and excitement level information (block S107).

Subsequently, the face image list display process module 301 reads out the CM section attribute information, music section attribute information and talk section attribute information from the database 111A, and displays the section bar. The section bar displays the bar area which is indicative of the position of each of the CM section, the music section and the talk section (block S108). The face image list display process module 301 may display three section bars (CM section bar, music section bar and talk section bar) on the basis of the CM section attribute information, music section attribute information and talk section attribute information. The CM section bar displays the bar area which is indicative of the position of the CM section. Similarly, the music section bar displays the bar area which is indicative of the position of the music section, and the talk section bar displays the bar area which is indicative of the position of the talk section.

Figure 15:
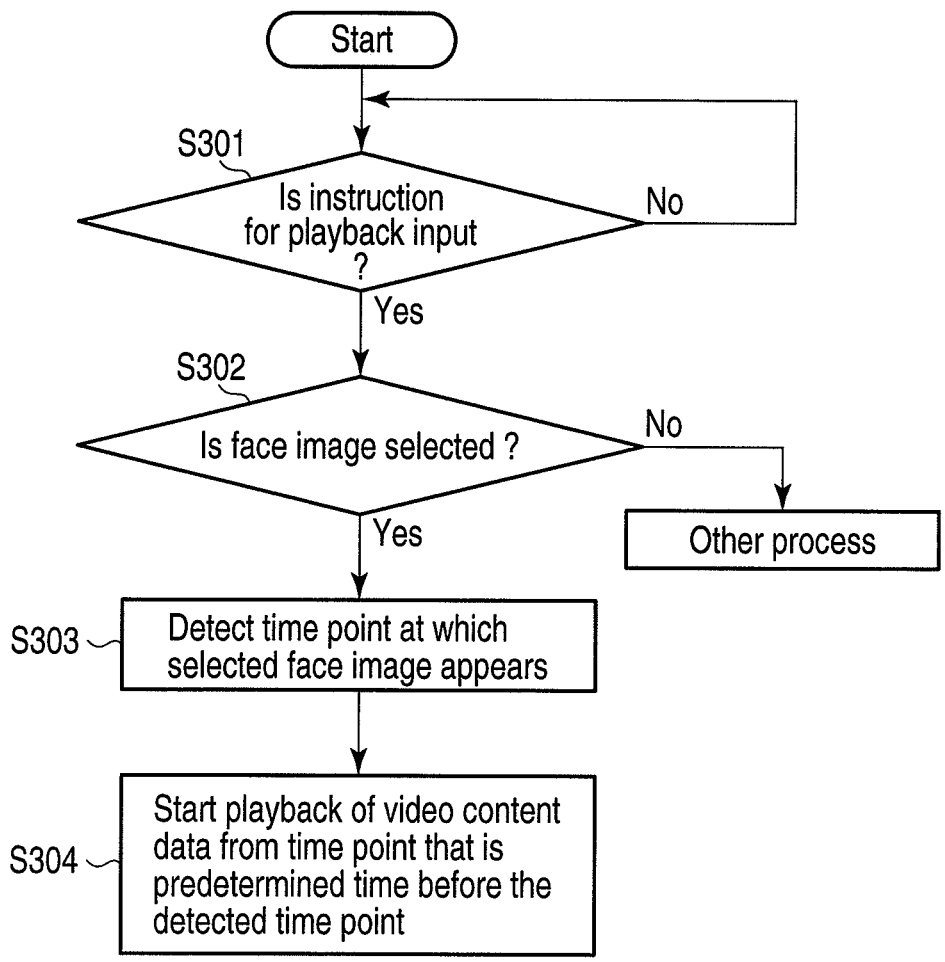
FIG. 15 is an exemplary flow chart illustrating an example of the procedure of a playback process which is executed by the electronic apparatus according to the embodiment.

Next, referring to a flow chart of FIG. 15, a description is given of the procedure of the playback process which is executed by the playback process module 403.

When an event of instructing playback of video content data is input in accordance with a user operation (YES in block S301), the playback process module 403 cooperates with the face image list display process module 301 and determines whether a certain face image on the face thumbnail display area is selected or not (block S302). If there is a face image which is selected (YES in block S302), the playback process module 403 detects a time point at which the selected face image appears, on the basis of the time stamp information of the selected face image (block S303). The playback process module 403 starts playback of video content data from the detected time point, or from a time point which is a predetermined time before the detected time point (e.g. from a time point which is two seconds before) (block S304).

When an invent of instructing playback of video content data is input in the state in which a certain thumbnail image on the bellows thumbnail display area is selected, the playback process module 403 starts, on the basis of the time stamp information of the selected thumbnail image, playback of video content data from a time point at which the selected thumbnail image appears, or from a time point which is a predetermined time before the time point at which the selected thumbnail image appears (e.g. from a time point which is two seconds before).

As has been described above, each of the face image and the thumbnail image can be used as a trigger for the playback of the video content data.

Figure 16:
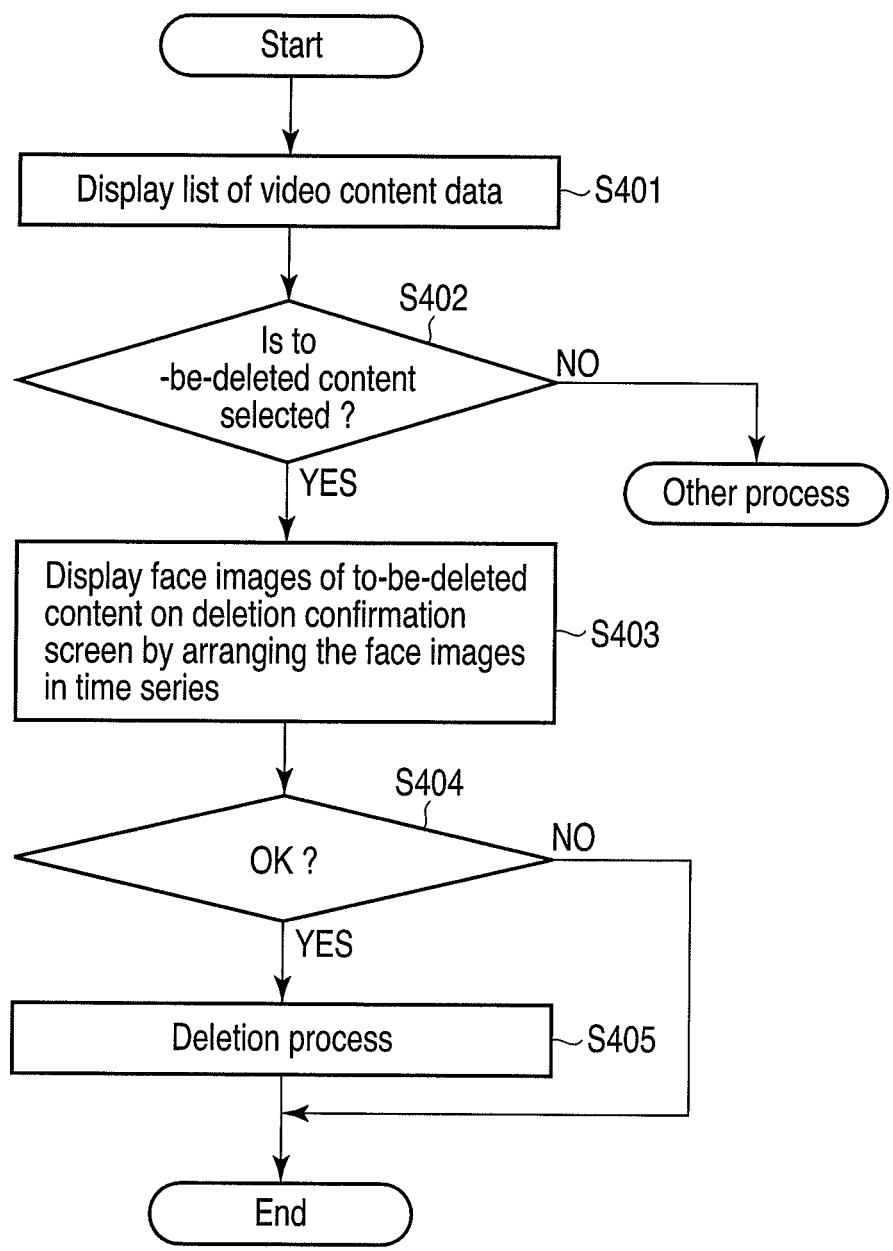
FIG. 16 is an exemplary flow chart illustrating an example of the procedure of a deletion confirmation process which is executed by the electronic apparatus according to the embodiment.

Next, referring to a flow chart of FIG. 16, a description is given of the procedure of the deletion confirmation process which is executed by the content management module 404.

When display of a list of video content data has been requested by the user operation, or when deletion of content has been requested by the user operation, the content management module 404 displays, on the display screen of the LCD 17, a content list screen which presents a list of video content data stored in the HDD 111 (block S401).

If certain video content data is selected by the user as to-be-deleted video content data (YES in block S402), the content management module 404 displays on the deletion confirmation screen the face images corresponding to the to-be-deleted video content data in a time-series arrangement fashion in an order corresponding to the order of time of appearance of these face images, and displays the deletion confirmation dialog on the deletion confirmation screen (block S403).

In the case where the YES button in the deletion confirmation dialog has been clicked by the user, that is, in the case where the user has decided to delete the to-be-deleted video content data (YES in block S404), the content management module 404 deletes the to-be-deleted video content data from the HDD 111 (block S405).

As has been described above, in the present embodiment, when deletion of certain video content data has been designated by the user, not only the message for prompting the user to reconfirm the deletion/non-deletion of the to-be-deleted video content data, but also the face images, which show the outline of the to-be-deleted video content data, are automatically displayed on the deletion confirmation screen. It is thus possible to present to the user the information that is useful in deciding the deletion/non-deletion of the to-be-deleted video content data. Therefore, the user operation relating to the deletion of video content data can be supported.

The above description of the present embodiment is mainly directed to the example in which the face images, which are extracted from the to-be-deleted video content data, are displayed on the deletion confirmation screen. However, instead of the face images, the thumbnail images, which are extracted from the to-be-deleted video content data, may be displayed on the deletion confirmation screen.

In the present embodiment, it is assumed that each video content data is composed of moving picture data and audio data. However, each video content data may be composed of moving picture data alone.

In addition, use may be made of video content data in which moving picture data and a plurality of still images (e.g. face images), which are extracted from this moving picture data, are packaged. In this case, the still images can be displayed on the deletion confirmation screen, even without executing the indexing process.

The procedures of the face image list display process, playback process and deletion confirmation process of the present embodiment can all be realized by software. Therefore, by installing the software in an ordinary computer via a computer-readable storage medium, the same advantageous effects as in the present embodiment can easily be realized.

The electronic apparatus of the present embodiment can be realized by not only the computer 10, but also by various consumer electronic apparatuses such as an HDD recorder, a DVD recorder and a TV apparatus. In this case, the functions of the TV application program 202 can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a storage device configured to store one or more moving picture data and still images extracted from each of the moving picture data;
a first display processing module configured to display a list of the one or more moving picture data; and
a second display processing module configured to display a deletion confirmation screen used for confirming whether to-be-deleted moving picture data may be deleted when the to-be-deleted moving picture data is selected from the list of the moving picture data, the deletion confirmation screen being a screen in which still images corresponding to the to-be-deleted moving picture data are arranged, wherein the second display processing module is configured to display, on the deletion confirmation screen, still images which correspond to the to-be-deleted moving picture data and which appear in a segment having previously been played in a sequence from the start to end of the to-be-deleted moving picture data, the still images which correspond to the to-be-deleted moving picture data determined and selected automatically by the second display processing module, and wherein the still images corresponding to the to-be-deleted moving picture data comprise a plurality of face images extracted from the to-be-deleted moving picture data, the electronic apparatus further comprises a playback history management module configured to manage a total playback time in which a frame corresponding to each face image has been played back by playback of the to-be-deleted moving picture data, and the second display processing module is configured to select a predetermined number of face images with a longest total playback time from the face images corresponding to the to-be-deleted moving picture data, and to display the selected face images on the deletion confirmation screen as still images belonging to the played-back segment.

2. The electronic apparatus of claim 1, wherein the second display processing module is configured to display a message prompting the user to confirm whether the to-be-deleted moving picture data may be deleted or not, in a region different from a region in which the still images are arranged.

3. The electronic apparatus of claim 1, wherein the still images corresponding to the to-be-deleted moving picture data comprise a plurality of face images extracted from the to-be-deleted moving picture data, the electronic apparatus further comprises
a third display processing module configured to display a list of face images corresponding to moving picture data selected from the one or more moving picture data on a display screen; and
a playback module configured to start playback of the selected moving picture data from a time corresponding to a position in the selected moving picture data, the position in the selected moving picture data being a position at which a face image selected from the list of the face images appears, and the second display processing module is configured to display the face images which correspond to the to-be-deleted moving picture data and which have previously been selected as reference times for starting playback as still images appearing in the played-back segment, on the deletion confirmation screen.

4. The electronic apparatus of claim 3, wherein the second display processing module is configured to select a face image which has previously been selected as the reference of the time for starting playback and face images corresponding to the same person as the face image which has previously been selected as the reference of the time, from among the face images corresponding to the to-be-deleted moving picture data, and to display the selected face images on the deletion confirmation screen.

5. An electronic apparatus comprising:
an indexing module configured to extract a plurality of face images from moving picture data, and to output time stamp information indicating times at which the extracted face images appear in the moving picture data;
a face image list display module configured to display a list of the extracted face images on a display area based on the time stamp information;
a playback module configured to start playback of the moving picture data from a time corresponding to a position in the moving picture data, the position in the moving picture data being a position at which a face image selected from the list of the face images appears; and
a deletion confirmation screen display module configured to display a deletion confirmation screen used for confirming whether the moving picture data may be deleted when deletion of the moving picture data is designated, the deletion confirmation screen being a screen in which face images corresponding to the moving picture data are arranged, the face images corresponding to the moving picture data determined and selected automatically by the display processing module, wherein the deletion confirmation screen display module is configured to display, on the deletion confirmation screen, face images which are included among the face images corresponding to the moving picture data and which appear in a segment having previously been played in a sequence from the start to end of the to-be-deleted moving picture data, and
further comprising a playback history management module configured to manage a total playback time in which a frame corresponding to each face image has been played back by previous playback of the moving picture data,
wherein the deletion confirmation screen display module is configured to select a predetermined number of face images with a longest total playback time from the face images corresponding to the moving picture data, and to display the selected face images on the deletion confirmation screen as face images belonging to the played-back segment.

6. The electronic apparatus of claim 5, wherein the deletion confirmation screen display module is configured to display, on the deletion confirmation screen, a face image which has previously been selected as a reference time for starting the playback, and face images corresponding to the same person as the face image, the displayed face images being included among the face images corresponding to the moving picture data.

7. The electronic apparatus of claim 5, wherein the deletion confirmation screen display module is configured to display a message prompting the user to confirm whether the moving picture data may be deleted or not, in a region different from a region in which the face images corresponding to the moving picture data are arranged.

* * * * *